United States Patent
Chen et al.

(10) Patent No.: US 11,651,065 B2
(45) Date of Patent: May 16, 2023

(54) SYSTEMS AND METHODS FOR EVALUATING A STORAGE MEDIUM

(71) Applicant: INNOGRIT TECHNOLOGIES CO., LTD., Shanghai (CN)

(72) Inventors: Moyang Chen, Shanghai (CN); Zining Wu, San Jose, CA (US)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 314 days.

(21) Appl. No.: 16/885,229

(22) Filed: May 27, 2020

(65) Prior Publication Data
US 2021/0271746 A1    Sep. 2, 2021

Related U.S. Application Data

(63) Continuation of application No. PCT/CN2020/077256, filed on Feb. 28, 2020.

(51) Int. Cl.
*G06F 21/44* (2013.01)
*G06F 3/06* (2006.01)
*H04L 9/32* (2006.01)

(52) U.S. Cl.
CPC .............. *G06F 21/44* (2013.01); *G06F 3/067* (2013.01); *G06F 3/0622* (2013.01); *G06F 3/0659* (2013.01); *H04L 9/3242* (2013.01); *H04L 9/3247* (2013.01)

(58) Field of Classification Search
CPC ........ G06F 21/44; G06F 3/0622; G06F 3/067; G06F 3/0659; H04L 9/3247; H04L 9/3242
See application file for complete search history.

(56) References Cited

U.S. PATENT DOCUMENTS

| | | |
|---|---|---|
| 8,590,040 B2 | 11/2013 | Ghetie et al. |
| 11,114,179 B1 * | 9/2021 | Ray ...................... G06F 3/0619 |
| 2006/0122854 A1 | 6/2006 | Campello et al. |
| 2006/0139069 A1 | 6/2006 | Frank et al. |
| 2010/0030982 A1 | 2/2010 | Sela et al. |
| 2011/0041039 A1 | 2/2011 | Harari et al. |
| 2013/0198450 A1 | 8/2013 | Malwankar et al. |
| 2015/0256344 A1 * | 9/2015 | Minamimoto ........ H04L 9/3247 |
| | | 713/176 |

(Continued)

OTHER PUBLICATIONS

International Search Report in PCT/CN2020/077256 dated Nov. 27, 2020, 5 pages.

(Continued)

*Primary Examiner* — Mark A Giardino, Jr.
(74) *Attorney, Agent, or Firm* — Metis IP LLC

(57) ABSTRACT

The present disclosure relates to methods and systems for evaluating a storage medium. The method may include receiving, via a user interface of a host, a user request to evaluate a storage medium coupled to a first controller. The method may also include determining whether there is a first binding history table associated with the storage medium stored in the host. In response to a determination that there is no first binding history table stored in the host, the method may include retrieving a binding history table from the storage medium via the first controller and determining the storage medium as a second-hand storage medium if there is at least one second controller different from the first controller in the binding history table.

18 Claims, 10 Drawing Sheets

(56) References Cited

U.S. PATENT DOCUMENTS

| | | |
|---|---|---|
| 2016/0092121 A1 | 3/2016 | Nazari et al. |
| 2017/0019399 A1 | 1/2017 | Yamazaki et al. |
| 2017/0288867 A1 | 10/2017 | Collier et al. |
| 2018/0293407 A1 | 10/2018 | Wu |
| 2020/0372967 A1* | 11/2020 | Rahman ............... G06K 9/6256 |

OTHER PUBLICATIONS

Written Opinion in PCT/CN2020/077256 dated Nov. 27, 2020, 3 pages.

* cited by examiner

SYSTEMS AND METHODS FOR EVALUATING A STORAGE MEDIUM

CROSS-REFERENCE TO RELATED APPLICATIONS

This application is a Continuation of International Application No. PCT/CN2020/077256, filed on Feb. 28, 2020, the contents of which are incorporated herein by reference.

TECHNICAL FIELD

The present disclosure generally relates to the data storage technology, and more specifically, to systems and methods for evaluating a storage medium.

BACKGROUND

A storage device (e.g., a solid-state device (SSD)) may include a controller and one or more storage media. For example, an SSD may include a controller and a NAND flash memory. Generally, a storage medium (e.g., a NAND flash memory) in the storage device has limited program/erase cycles. That is to say, the storage medium may be worn out after a certain number of read/write cycles and should not be used anymore. However, in practice, some low end manufacturers may assemble a storage device by combining a recycled or second-hand storage medium (e.g., a NAND flash memory that has been used in a data center for a long time) with a new controller. In other situations, some low end manufacturer may fake the mark on a storage medium of a storage device. Both of those situations described may cause the storage device to have shorter service lifetime, and further compromise the reputation of other manufactures. Therefore, it is desirable to provide systems and methods for evaluating a storage medium in a storage device to determine whether the storage medium in the storage device has been used before, i.e., to determine whether the storage medium is a second-hand storage medium.

SUMMARY

According to an aspect of the present disclosure, a method for evaluating a storage medium is provided. The method may be implemented on a host having at least one processor, a storage and a communication platform to connect to a network. The method may include receiving a user request to evaluate a storage medium coupled to a first controller via a user interface of the host. The method may also include determining whether there is a first binding history table associated with the storage medium stored in the host. The method may also include transmitting a first command to the first controller in response to a determination that there is no first binding history table associated with the storage medium stored in the host. The method may also include obtaining, based on the first command, a binding history table from the storage medium via the first controller. The method may also include determining whether there is at least one second controller different from the first controller. The method may further include determining the storage medium as a second-hand storage medium in response to a determination that there is the at least one second controller different from the first controller in the binding history table.

In some embodiments, the method may further include determining whether the first controller is included in the binding history table in response to a determination that there is no second controller different from the first controller in the binding history. The method may further include transmitting a second command to the first controller in response to a determination that the first controller is not in the binding history table, and obtaining, based on the second command, a first updated binding history table associated with the storage medium. The first updated binding history table may be generated by adding a new binding history record corresponding to the first controller.

In some embodiments, the method may further include transmitting a third command to the first controller in response to a determination that the first controller is already in the binding history table; and obtaining, based on the third command, a second updated binding history table associated with the storage medium. The second updated binding history table may be generated by incrementing a binding count corresponding to the first controller by a pre-set value.

In some embodiments, the method may further include transmitting a fourth command (also referred to as "CMD4") to the first controller. The CMD4 may further direct the first controller to obtain a first secure key of the storage medium. The first command may further direct the first controller to obtain first authentication information for the binding history table from the storage medium, and verify the first authentication information using the first secure key. The first authentication information may be generated by the storage medium using a second secure key of the storage medium.

In some embodiments, the method may further include transmitting a fifth command to the first controller. The fifth command may direct the first controller to transmit a third secure key of the first controller to the storage medium. The first command may further direct the first controller to obtain a first Hash value (also referred to as "Hash Value 1") for the third secure key from the storage medium; obtain a second Hash value (also referred to as "Hash Value 2") for the first secure key from the storage medium; check whether the first Hash value is equal to a third Hash value (also referred to as "Hash Value 3") for the third secure key; and check whether the Hash Value 2 is equal to a fourth Hash value (also referred to as "Hash Value 4") for the first secure key. The Hash Value 3 may be generated by the first controller. The Hash Value 4 may be generated by the first controller.

In some embodiments, the fifth command may direct the first controller to transmit a nonce to the storage medium. The first command may further direct the first controller to obtain a fifth Hash value (also referred to as "Hash Value 5") for the nonce from the storage medium; and check whether the Hash Value 5 is equal to a sixth Hash value (also referred to as "Hash Value 6") for the nonce. The Hash Value 6 may be generated by the first controller.

In some embodiments, the second command may further direct the first controller to transmit second authentication information for the new binding history record to the storage medium. The second authentication information may be generated by the first controller using a fourth secure key of the first controller. The third command may further direct the first controller to transmit third authentication information for the second updated binding history table to the storage medium. The third authentication information may be generated by the first controller using the fourth secure key. The second authentication information or the third authentication information may be verified by the storage medium using a fifth secure key of the first controller.

In some embodiments, the method may further include transmitting a sixth command to the first controller in response to a determination that there is the first binding history table stored in the host; obtaining, based on the sixth command, a second binding history table associated with the storage medium from the first controller; determining whether the second binding history table is the same as the first binding history table; determining whether there is at least one third controller different from the first controller in the second binding history table in response to a determination that the second binding history table is not the same as the first binding history table; and determining the storage medium as a second-hand storage medium in response to a determination that there is the at least one third controller different from the first controller in the second binding history table.

In some embodiments, the method may further include determining whether the first controller is included in the second binding history table in response to a determination that the second binding history table is the same as the first binding history table; transmitting a seventh command to the first controller in response to a determination that the first controller is not in the second binding history table; and obtaining, based on the seventh command, a third updated binding history table associated with the storage medium. The third updated binding history table may be generated by adding a new binding history record corresponding to the first controller.

In some embodiments, the method may further include transmitting an eighth command to the first controller in response to a determination that the first controller is already in the second binding history table; obtaining, based on the eighth command, a fourth updated binding history table associated with the storage medium. The fourth updated binding history table may be generated by incrementing a binding count corresponding to the first controller by a pre-set value.

According to another aspect of the present disclosure, a host for evaluating a storage medium is provided. The host may have at least one processor, a storage and a communication platform to connect to a network for evaluating a storage medium. The host may include a user interface configured to receive a user request to evaluate a storage medium coupled to a first controller. The host may also include a processing module configured to determine whether there is a first binding history table associated with the storage medium stored in the host. The host may also include a communication interface configured to transmit a first command to the first controller in communication with the host in response to a determination that there is no binding history table stored in the host; and obtain, based on the first command, a binding history table from the storage medium via the first controller. The processing module may be further configured to determine whether there is at least one second controller different from the first controller in the binding history table, and determine the storage medium as a second-hand storage medium in response to a determination that there is the at least one second controller different from the first controller in the binding history table.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
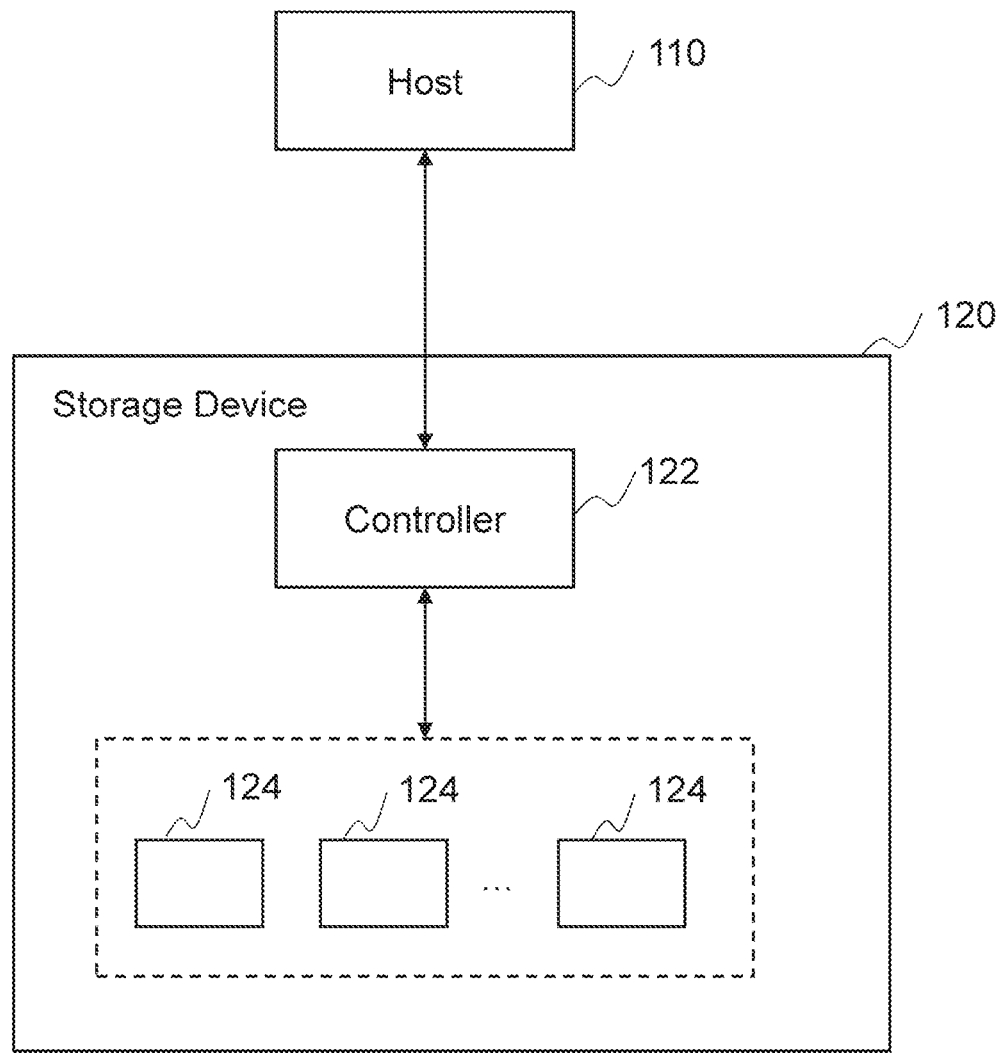
FIG. 1 is a schematic diagram illustrating an exemplary system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular exemplary embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," and/or "module" used herein are one method to distinguish different components, elements, parts, section or assembly of different level in ascending order. However, the terms may be displaced by another expression if they achieve the same purpose.

It will be understood that when a unit, engine or module is referred to as being "on," "connected to," or "coupled to," another unit, engine, or module, it may be directly on, connected or coupled to, or communicate with the other unit, engine, or module, or an intervening unit, engine, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for evaluating a storage medium coupled to a specific controller. According to the present disclosure, the systems and methods may obtain a binding history table from the storage medium via the specific controller. The systems and methods may then determine whether the binding history table records at least one other controller different from the specific controller. In response to a determination that there is at least one other controller recorded in the binding history table, the systems and methods may determine the storage medium as a secondhand storage medium. In some embodiments, during the process of evaluating the storage medium, the systems and methods may further provide cryptographic services (e.g., digital signatures) to ensure that the information exchange between the storage medium and the controller is not falsified.

FIG. 1 is a schematic diagram illustrating an exemplary system 100 according to some embodiments of the present disclosure. As shown in FIG. 1, the system 100 may include a host 110 and a storage device 120. The storage device 120 may include a controller 122 and one or more storage media 124.

The host 110 may be an entity in communication with the storage device 120. For example, the host 110 may transmit a command to retrieve data from the storage device 120. The storage device 120 may transmit data to the host 110 in response to the command. In some embodiments, the host 110 may be capable of accessing the one or more storage media 124 through the controller 122. For example, the host 110 may retrieve data (e.g., a binding history table) from the one or more storage media 124 through the controller 122.

In some embodiments, the host 110 may receive a user input via a user interface of the host 110. In some cases, the user input may be a request to store data to the storage device 120. In such cases, the host 110 may process the user input and transmit the data (e.g., unencrypted data or encrypted data) to the controller 122 of the storage device 120. The controller 122 of the storage device 120 may then process the data and transmit the data to the one or more storage media 124 for storage. In other cases, the user input may be a request to retrieve data from the storage device 120. In such cases, the host 110 may process the user input and transmit the request to the controller 122 of the storage device 120. The controller 122 of the storage device 120 may then process the request and retrieve the requested data (e.g., unencrypted data or encrypted data) from the one or more storage media 124. The transmission of the data and/or request(s) between the host 110 and the storage device 120 may be implemented via an interface, such as a serial advanced technology attachment (SATA) interface, a mini-SATA (mSATA) interface, a universal serial bus (USB) interface, a multimedia card (MMC) interface, a secure digital (SD) interface, a peripheral component interconnect (PCI) express (PCIe) interface, an M.2 interface, a serial attached small computer system interface (SCSI) (SAS) interface, an Ethernet interface, etc. In some embodiments, the host 110 may receive the request to store data (and/or the request to retrieve data) from another device that is in communication with the host 110. The another device may be a peripheral device attached to the host 110, or a remote device connected to the host 110 via a network (e.g., the Internet).

In some embodiments, the host 110 may include a mobile device, a tablet computer, a laptop computer, a built-in device in a vehicle, or the like, or any combination. In some embodiments, the mobile device may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, a built-in device in the vehicle may include an onboard computer, an onboard television, etc.

The storage device 120 may be configured to store data. For example, the storage device 120 may store data obtained from the host 110. In some embodiments, the storage device 120 may be a hard disk drive (HDD), a solid-state drive (SSD), or any other types of storage device. The controller 122 of the storage device 120 may be an electrical component that enables the host 110 to access or read data from, delete or modify data of, or write data into the one or more media 124 of the storage device 120. The controller 122 may be configured to translate commands (or referred to as instructions) received from the host 110 into commands that can be understood by the one or more media 124 and vice versa. For example, the storage device 120 may receive a read command from the host 110. The read command may be used to retrieve data from the one or more storage media 124 of the storage device 120, and may be consistent with a protocol used between the host 110 and the storage device 120 (e.g., the controller 122). After receiving the read command, the controller 122 may translate the read command into a command that can be understood by the one or more storage media 124. Therefore, the host 110 may retrieve data from the one or more storage media 124 through the controller 122. In some embodiments, the protocol used between the host 110 and the storage device 120 may include a non-volatile memory express (NVMe) protocol, an advanced host controller interface (AHCI) protocol, etc.

In some embodiments, the controller 122 may include one or more processing engines (e.g., a single-core processing engine or a multi-core processor). Merely by way of example, the controller 122 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a microcontroller unit, a reduced instruction-set computer (RISC), a microprocessor, or the like, or any combination thereof.

The one or more storage media 124 of the storage device 120 may be configured to store data and/or instructions. For example, the one or more storage media 124 may store data obtained from the host 110. A storage medium 124 in the storage device 120 may include any suitable type of storage medium. In some embodiments, the storage device 120 may be an SSD. The storage medium 124 in the storage device 120 may be a flash memory, or a dynamic random-access memory (DRAM), etc. Exemplary flash memory may include a NAND flash memory, a triple-level cell (TLC) flash memory, a multi-level cell (MLC) flash memory, a single-level cell (SLC) flash memory, etc. In some embodiments, the one or more storage media 124 in the storage device 120 may be of the same type. For example, each of the one or more storage media 124 may be a NAND flash memory. In some embodiments, the one or more storage media 124 in the storage device 120 may be of different types. For example, some of the one or more storage media 124 may be NAND flash memories, and some of the one or more storage media 124 may be DRAMs.

The controller 122 may be in communication with the one or more storage media 124 via one or more communication interfaces in the controller 122. In some embodiments, the number of the one or more communication interfaces may be equal to the number of the one or more storage media 124. In some embodiments, the number of the one or more communication interfaces may be greater than or less than the number of the one or more storage media 124. For example, a single communication interface in the controller 122 can support the communication with multiple storage media 124.

While the controller 122 and the one or more storage media 124 are shown as two separate parts in FIG. 1, it should be understood that the controller 122 and the one or more storage media 124 can be arranged in any suitable manner. In some embodiments, the controller 122 and the one or more storage media 124 may be packaged in two different packages. The controller 122 may be fabricated on a first die that are packaged in a first package of the two different packages. The one or more storage media 124 may be fabricated on a second die that are packaged in a second package of the two different packages. In some embodiments, the controller 122 and the one or more storage media 124 may both reside within a common multi-chip package. The controller 122 may be fabricated on a first die that is packaged in the common multi-chip package, and the one or more storage media 124 may be fabricated on a second die that is packaged in the common multi-chip package. In some embodiments, the controller 122 and the one or more storage media 124 may be integrated on a same die.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 2:
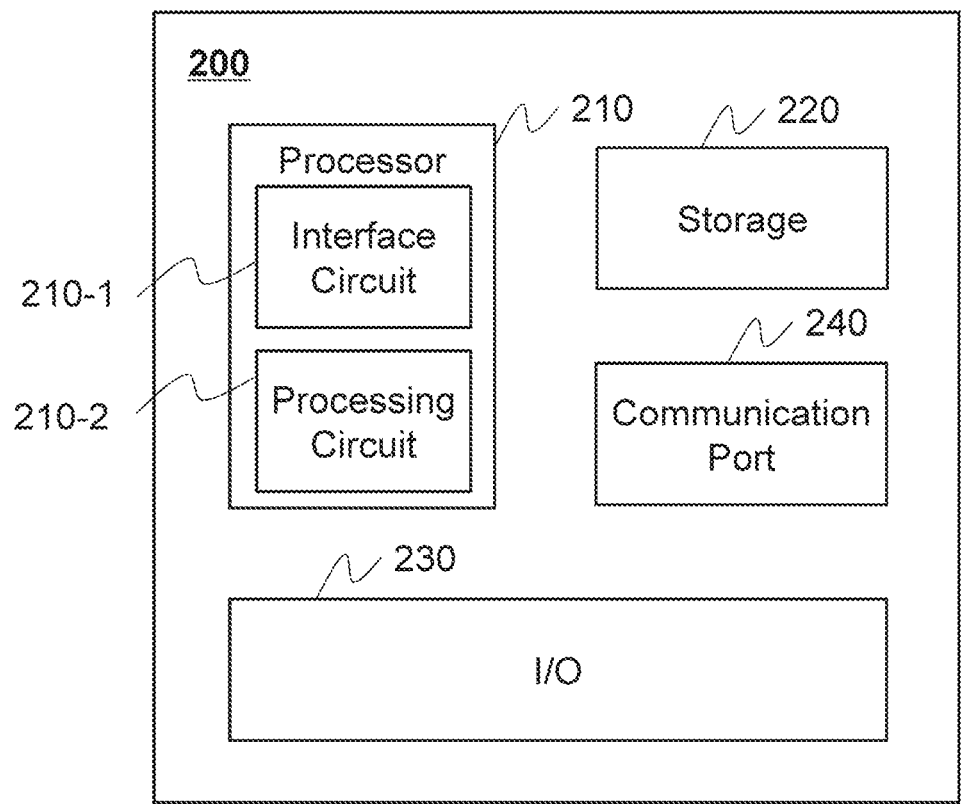
FIG. 2 is a schematic diagram illustrating exemplary hardware and/or software components of a computing device according to some embodiments of the present disclosure.

FIG. 2 is a schematic diagram illustrating exemplary hardware and/or software components of a computing device 200 according to some embodiments of the present disclosure. In some embodiments, the host 110 illustrated in FIG. 1 may be implemented on the computing device 200. As illustrated in FIG. 2, the computing device 200 may include a processor 210, a storage 220, an input/output (I/O) 230, and a communication port 240.

The processor 210 (e.g., a logic circuit) may execute computer instructions (e.g., program codes) and perform functions of the host 110 in accordance with techniques described herein. For example, the processor 210 may include an interface circuit 210-1 and a processing circuit 210-2 therein. The interface circuit 210-1 may be configured to receive electronic signals from a bus (not shown in FIG. 2), wherein the electronic signals encode structured data and/or instructions for the processing circuits 210-2 to process. The processing circuit 210-2 may conduct logic calculations, and then determine a conclusion, a result, and/or an instruction encoded as electronic signals. Then the interface circuit 210-1 may send out the electronic signals from the processing circuits 210-2 via the bus.

The computer instructions may include, for example, routines, programs, objects, components, data structures, procedures, modules, which perform particular functions described herein. For example, the processor 210 may evaluate a storage medium 124. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the storage device 120, and/or any other component of the system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The I/O 230 may input and/or output signals, data, information, etc. In some embodiments, the I/O 230 may enable a user interaction with the host 110. In some embodiments, the I/O 230 may include an input device and an output device. Examples of the input device may include a keyboard, a mouse, a touchscreen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the Internet) to facilitate data communications. The communication port 240 may establish connections between the host 110 and the storage device 120. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G, etc.), or the like, or any combination thereof. In some embodiments, the communication port 240 may be and/or include a standardized communication port, such as an RS232 port, an RS485 port, an SATA port, an mSATA port, a USB port, an MMC port, a SD port, a PCIe port, etc.

Figure 3:
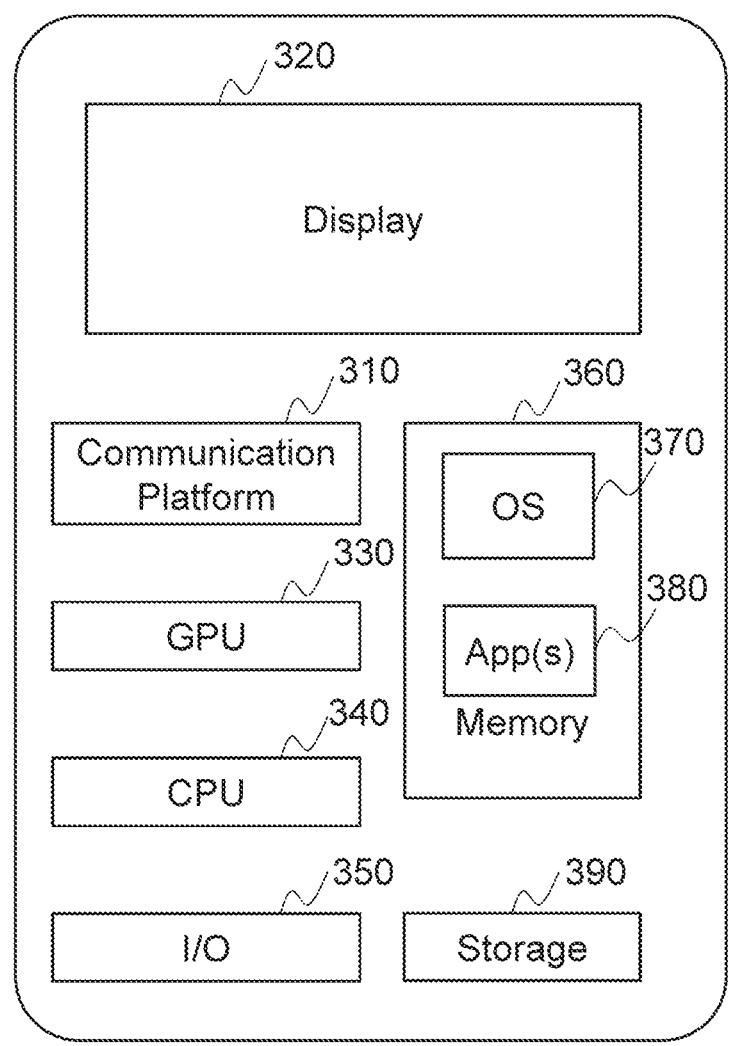
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, the host 110 illustrated in FIG. 1 may be implemented on the mobile device 300. As illustrated in FIG. 3, the mobile device 300 may include a communication platform 310, a display 320, a graphic processing unit (GPU) 330, a central processing unit (CPU) 340, an input/output (I/O) 350, a memory 360, and a storage 390. In some embodiments, any other suitable component, including but not limited to a system bus or a controller (not shown), may also be included in the mobile device 300. In some embodiments, a mobile operating system (OS) 370 (e.g., iOS™, Android™, Windows Phone™ etc.) and one or more applications 380 may be loaded into the memory 360 from the storage 390 in order to be executed by the CPU 340. The applications 380 may include a browser or any other suitable mobile apps for receiving and rendering information relating to a service of the system 100 or other information from the system 100, and sending information relating to a service of the system 100 or other information to the system 100. User interactions with the information stream may be achieved via the I/O 350 and provided to the host 110 and/or other components of the system 100.

Figure 4:
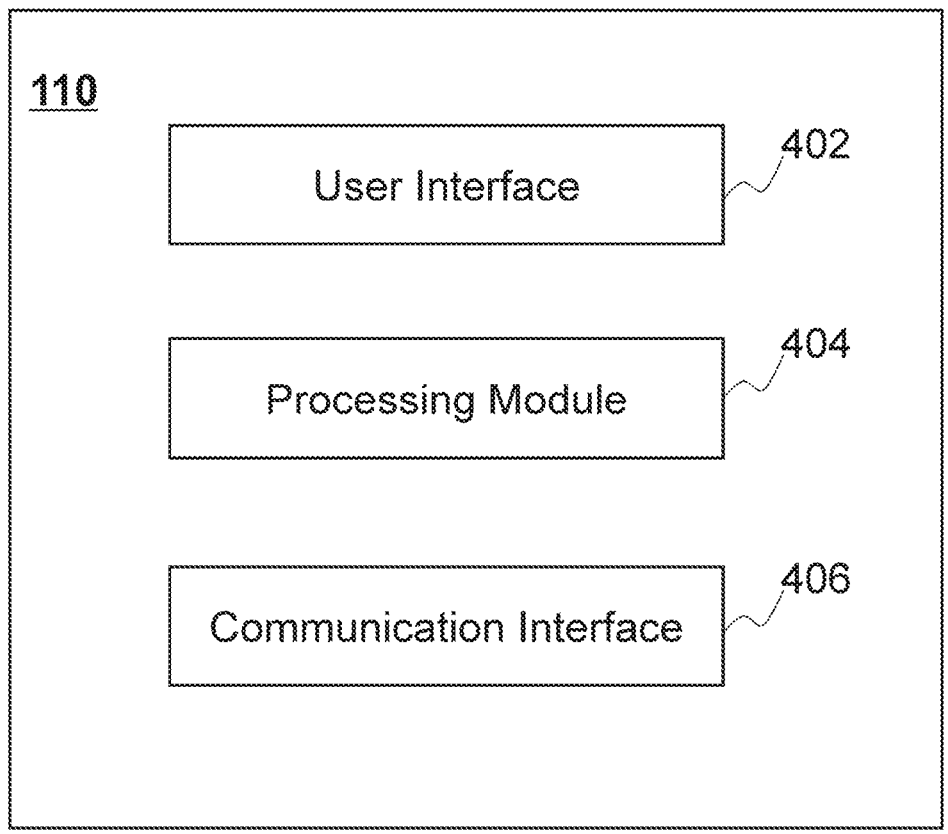
FIG. 4 is a block diagram illustrating an exemplary host according to some embodiments of the present disclosure.

FIG. 4 is a block diagram illustrating an exemplary host 110 according to some embodiments of the present disclosure. At least a portion of the host 110 may be implemented on the computing device 200 as illustrated in FIG. 2 or the mobile device 300 as illustrated in FIG. 3. As illustrated in FIG. 4, the host 110 may include a user interface 402, a processing module 404, and a communication interface 406.

The user interface 402 may enable a user to interact with the host 110. In some embodiments, the user interface 402 may perceive user interactions with the host 110 and generate one or more instructions to operate one or more components of the host 110 or other components in the system 100. The one or more instructions may include, for example, an instruction to operate the host 110 to store data to the storage device 120, an instruction to operate the host 110 to retrieve data from the storage device 120, an instruction to operate the host 110 to evaluate a storage medium 124 in the storage device 120, or the like, or any combination thereof. In some embodiments, the user interface 402 may include one or more input devices, such as a touchscreen, a keyboard, a mouse, a trackball, a joystick, a stylus, an audio recognition device, a facial recognition device, etc. For example, a keyboard may be integrated in the host 110. An instruction may be generated in response to a user pressing down one or more keys on the keyboard in a certain sequence. In some embodiments, the instruction generated via the keyboard may direct the host 110 to store data to the storage device 120. In some embodiments, the instruction generated via the keyboard may direct the host 110 to retrieve data from the storage device 120. As another example, a mouse may be integrated in the host 110. An instruction may be generated in response to a user clicking the mouse in a region related to an application installed on the host 110. In some embodiments, the instruction generated by the mouse may direct/activate the host 110 (e.g., the user application of the host 110) to evaluate the storage medium 124 in the storage device 120.

The processing module 404 may be configured to process information and/or data. The information and/or data may be received from other components of the host 110 (e.g., the user interface 402, or the communication interface 406). For example, the processing module 404 may receive a binding history table associated with the storage medium 124 in the storage device 120 from the communication interface 406. The processing module 404 may then perform operations to determine whether the storage medium 124 is a second-hand storage medium based on the binding history table. In some embodiments, the processing module 404 may include one or more processing engines (e.g., a single-core processing engine or a multi-core processor). Merely by way of example, the processing module 404 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The communication interface 406 may be configured to facilitate exchange of information and/or data. The host 110 may communicate with the storage device 120 (e.g., the controller 122) via the communication interface 406. For example, the communication interface 406 may transmit a command generated by the host 110 to the controller 122 to obtain a binding history table associated with the storage medium 124. The communication interface 406 may then obtain, based on the command, the binding history table associated with the storage medium 124 from the controller 122. In some embodiments, the communication interface 406 may include an SATA interface, an mSATA interface, a USB interface, an MMC interface, an SD interface, a PCIe interface, an M.2 interface, an SAS interface, an Ethernet interface, etc.

More descriptions of the user interface 402, the processing module 404, and/or the communication interface 406 may be found elsewhere in the present disclosure (e.g., FIGS. 7-10 and the descriptions thereof). The components in the host 110 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof.

It should be noted that the above description of the host 110 is merely provided for the purposes of illustration, and is not intended to limit the scope of the present disclosure. For persons having ordinary skills in the art, multiple variations or modifications may be made under the teachings of the present disclosure. However, those variations and modifications may not depart from the scope of the present disclosure. For example, the host 110 may further include a storage module (not shown in FIG. 4). The storage module may be configured to store information and/or data generated during any process performed by any component of the host 110.

Figure 5:
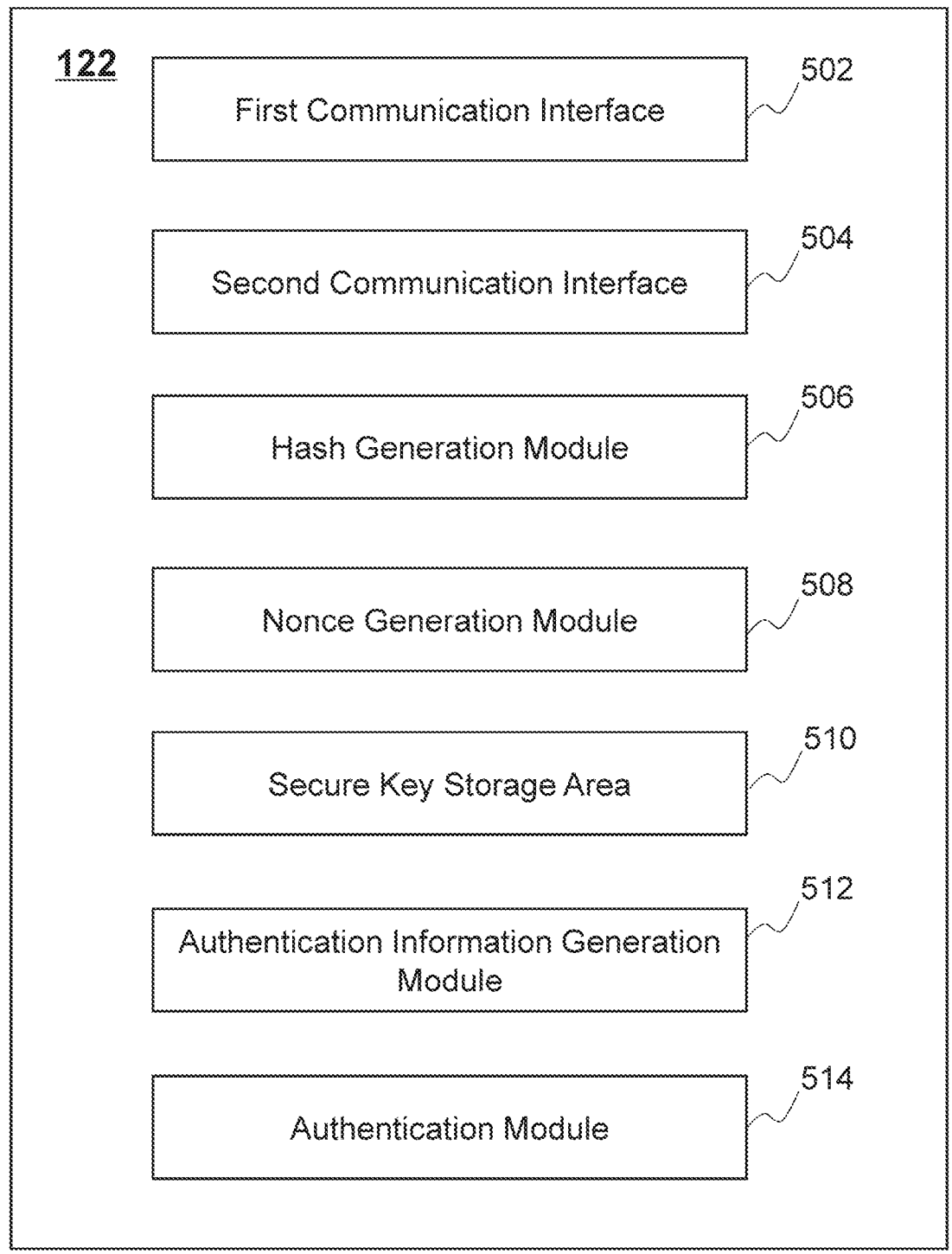
FIG. 5 is a block diagram illustrating an exemplary controller according to some embodiments of the present disclosure.

FIG. 5 is a block diagram illustrating an exemplary controller 122 according to some embodiments of the present disclosure. As illustrated in FIG. 5, the controller 122 may include a first communication interface 502, a second communication interface 504, a Hash generation module 506, a nonce generation module 508, a secure key storage area 510, an authentication information generation module 512, and an authentication module 514.

The first communication interface 502 may be configured to enable communication between the controller 122 and a host (e.g., the host 110). In some embodiments, the first communication interface 502 may receive one or more commands from the host 110 (e.g., via the communication interface 406 of the host 110). The one or more commands may direct the controller 122 to perform one or more operations. Merely by way of example, the one or more operations may include obtaining a binding history table or an updated binding history table from a storage medium 124 in the storage device 120, obtaining or transmitting a secure key (e.g., a public key, a private key), obtaining or transmitting a Hash value, obtaining or transmitting authentication information (e.g., a digital signature), etc. In some embodiments, the first communication interface 502 may include an SATA interface, an mSATA interface, a USB interface, an MMC interface, an SD interface, a PCIe interface, an M.2 interface, an SAS interface, or an Ethernet interface, etc.

The second communication interface 504 may be configured to enable communication between the controller 122 and a storage medium (e.g., the storage medium 124 in the storage device 120). For example, the second communication interface 504 may obtain a binding history table associated with the storage medium 124 from the storage medium 124. As another example, the second communication interface 504 may transmit a secure key (e.g., a public key of the controller 122) stored in the secure key storage area 510 to the storage medium 124. In some embodiments, the second communication interface 504 may include an open NAND flash interface (ONFI) interface, or a toggle mode interface, etc. In some embodiments, the controller 122 may include more than one second communication interface 504. In some embodiments, the number of the more than one second communication interface 504 may be equal to the number of the one or more storage media 124 in the storage device 120. In some embodiments, the number of the one or more second communication interfaces 504 may be greater than or less than the number of the one or more storage media 124. For example, a single second communication interface 504 can support the communication with multiple storage media 124.

The Hash generation module 506 may be configured to generate a Hash value for data. The data may be obtained from other components of the controller 122, or other components of the system 100. In some embodiments, the data may include a secure key (e.g., a secure key stored in the secure key storage area 510, a secure key obtained from the storage medium 124), a nonce generated by the nonce generation module 508, or a binding history table obtained from the storage medium 124 in the storage device 120, etc. The data may be of arbitrary size, and the Hash value for the data may be a bit string of a fixed size (e.g., 256 bits, etc.).

The Hash generation module 506 may generate the Hash value for the data using a Hash algorithm. In some embodiments, the Hash algorithm may include an MD5 algorithm, a secure Hash algorithm (SHA), etc. The SHA may include an SHA-1, an SHA-2, or an SHA-3. The SHA-1 may be a Hash algorithm that produces 160-bit Hash values. The SHA-2 may be a set of Hash algorithms including, for example, the SHA-224 that produces 224-bit Hash values, the SHA-256 that produces 256-bit Hash values, the SHA-512 that produces 512-bit Hash values, etc. The SHA-3 may be a set of Hash algorithms including, for example, the SHA3-224 that produces 224-bit Hash values, the SHA3-256 that produces 256-bit Hash values, the SHA3-384 that produces 384-bit Hash values, the SHA3-512 that produces 512-bit Hash values, etc.

The nonce generation module 508 may be configured to generate a nonce during a communication between the controller 122 and a storage medium (e.g., the storage medium 124 in the storage device 120). The nonce may include a random or pseudo random number, text, codes, etc. In some embodiments, the nonce may be used during the communication to ensure the security of the communication and abandoned after the communication is completed. In some embodiments, the nonce generated by the nonce generation module 508 may be stored in a volatile memory in the controller 122 (e.g., a buffer (not shown) in the controller 122), such that the nonce can be abandoned on the occurrence of power disruption or a power cycle event.

The secure key storage area 510 may be configured to store one or more secure keys used for cryptographic purposes. The secure key(s) stored in the secure key storage area 510 may include a public key, a private key, a pre-shared key, etc.

In some embodiments, a public key and a private key may form a key pair. As used herein, the public key is the public half of the key pair, and may be disseminated widely and openly. The private key of the key pair is the private or secret half of the key pair, and needs to be kept by its owner privately.

In some embodiments, the key pair may be used for data encryption and decryption. For example, the public key may be used for encrypting data, and the private key may be used for decrypting the encrypted data. In this case, the public key may ensure that the encrypted data can only be decrypted by an entity holding the corresponding private key. In some embodiments, the key pair may be used for digital signatures. In this case, the private key is used for generating a digital signature for data, and the public key is used for verifying the digital signature generated by the entity holding the private key.

According to some embodiments of the present disclosure, the controller 122 may hold a key pair including a public key and a private key. The controller 122 may store the key pair in the secure key storage area 510. In some embodiments, the controller 122 may send the public key of the controller 122 to the storage medium 124 in the storage device 120 via the second communication interface 504, and keep the private key of the controller 122 in the secure key storage area 510. Specifically, the controller 122 may generate a digital signature (e.g., a digital signature for a binding history record transmitted from the controller 122 to the storage medium 124) using the private key of the controller 122, and send the digital signature to the storage medium 124. The digital signature may be verified by the storage medium 124 using the public key of the controller 122 received from the controller 122. Similarly, the secure key storage area 510 may also obtain the public key of the storage medium 124, and use it to verify the digital signature (e.g., a digital signature for a binding history table of the storage medium 124) generated by the storage medium 124 using the private key of the storage medium 124.

A pre-shared key may be a secret (e.g., a password, a passphrase, a number or an array of randomly chosen bytes) that is shared between two entities (e.g., the controller 122 and the storage medium 124) using a secure channel. In some embodiments, the pre-shared key may be used for encryption. The data encrypted by the pre-shared key can only be decrypted by an entity holding the same pre-shared key. In some embodiments, the pre-shared key may be used for generating a message authentication code (MAC) value. For example, assuming that the controller 122 and the storage medium 124 commonly share a pre-shared key, during the exchange of data, the controller 122 may generate an MAC value (e.g., an MAC value for a binding history record of the controller 122) using the pre-shared key, and transmit the MAC value to the storage medium 124. Then, the MAC value may be verified by the storage medium 124 using the same pre-shared key.

The authentication information generation module 512 may generate authentication information for data transmitted by the controller 122. In some embodiments, the data transmitted by the controller 122 may include a binding history record transmitted from the controller 122 to the storage medium 124. The authentication information may be used by the storage medium 124 to verify that the data transmitted by the controller 122 has not been changed, modified, or altered in transmission.

In some embodiments, the authentication information may include a digital signature, an MAC value, etc. For example, the authentication information generation module 512 may generate a digital signature for data transmitted by the controller 122 using the private key of the controller 122 based on the Hash value for the data generated by the Hash generation module 506. Specifically, the Hash generation module 506 may firstly generate a Hash value for the data and then transmit the Hash value to the authentication information generation module 512. The authentication information generation module 512 may then digitally sign (i.e., encrypt) the Hash value using the private key of the controller 122 to generate the digital signature. In some embodiments, the authentication information generation module 512 may generate the digital signature using an RSA algorithm, an elliptic curve digital signature algorithm (ECDSA), etc. As another example, the authentication information generation module 512 may generate a MAC value for data transmitted by the controller 122 using the pre-shared key between the controller 122 and the storage medium 124. Specifically, the data and the pre-shared key may be used as input to a Hash algorithm of the Hash generation module 506 to generate a Hash value. The authentication information generation module 512 may determine the Hash value as the MAC value and transmit the MAC value to the storage medium 124. The MAC value generated based on the Hash algorithm and the pre-shared key may also be referred to as a Hash-based MAC (HMAC).

The authentication module 514 may be configured to authenticate data obtained by the controller 122. In some embodiments, the data obtained by the controller 122 may include a binding history table transmitted from a storage medium (e.g., the storage medium 124). The authentication module 514 may authenticate the binding history table by verifying the authentication information for the binding history table. The authentication information for the binding history table may include a digital signature, or an MAC value, etc.

For example, the controller 122 may obtain the binding history table signed with a digital signature generated by the storage medium 124. The digital signature may be generated using the private key of the storage medium 124 according to a signature generation process. To authenticate the binding history table, the authentication module 514 may verify the digital signature using the public key of the storage medium 124 according to a signature verification process. In some embodiments, the authentication module 514 may verify that the binding history table is authentically transmitted from the storage medium 124, and the binding history table has not been changed, modified, or altered in transmission. In some embodiments, the authentication module 514 may determine that the binding history table obtained by the controller 122 is false. In this case, the controller 122 may discard that binding history table.

As another example, the controller 122 may obtain a binding history table and an MAC value for the binding history table from the storage medium 124. The MAC value for the binding history table may be generated by performing a Hash algorithm on the binding history table and the pre-shared key between the storage medium 124 and the controller 122. To authenticate the binding history table, the authentication module 514 may verify the MAC value using the pre-shared key between the storage medium 124 and the controller 122 stored in the secure key storage area 510. Specifically, the MAC value verification process may include a series of operations. The authentication module 514 may firstly obtain a new MAC value for the binding history table. The new MAC value may be generated by the Hash generation module 506 by performing the same Hash algorithm on the binding history table and the pre-shared key stored in the secure key storage area 510. The authentication module 514 may then check whether the new MAC value is equal to the MAC value received from the storage medium 124. If the new MAC value is equal to the MAC value received from the storage medium 124, the authentication module 514 may verify that the binding history table is authentically transmitted from the storage medium 124, and the binding history table has not been changed, modified, or altered in transmission. If the new MAC value is not equal to the MAC value received from the storage medium 124, the authentication module 514 may determine that the binding history table is false. In this case, the controller 122 may discard that binding history table.

As described above, the public key of the storage medium 124 may be used by the controller 122 during the digital signature verification process. The public key of the storage medium 124 may be obtained from, for example, the storage medium 124 before the digital signature verification process. In some embodiments, before the digital signature verification process, the authentication module 514 may also authenticate the public key of the storage medium 124 obtained by the controller 122. For example, the authentication module 514 may obtain a Hash Value 1 for the public key of the storage medium 124 from the storage medium 124. The Hash Value 1 may be generated by the storage medium 124 using a Hash algorithm. The authentication module 514 may then obtain a Hash Value 2 for the public key of the storage medium 124 from the Hash generation module 506. The Hash generation module 506 may generate the Hash Value 2 for the public key of the storage medium 124 using the same Hash algorithm. The authentication module 514 may check whether the Hash Value 1 is equal to the Hash Value 2. If the Hash Value 1 and the Hash Value 2 for the public key of the storage medium 124 are the same, the authentication module 514 may verify that the public key of the storage medium 124 is authentically transmitted from the storage medium 124, and the public key of the storage medium 124 has not been changed, modified, or altered in transmission. Similarly, the pre-shared key between the controller 122 and the storage medium 124 may be used during the MAC value verification process. Before the information exchange between the controller 122 and the storage medium 124, the pre-shared key may be shared therebetween. Merely by way of example, the pre-shared key may be generated by the storage medium 124 and transmitted to the controller 122. In some embodiments, the authentication module 514 may also authenticate the pre-shared key obtained by the controller 122. For example, the authentication module 514 may obtain a Hash Value 1 for the pre-shared key from the storage medium 124. The Hash Value 1 may be generated by the storage medium 124 using a Hash algorithm. The authentication module 514 may then obtain a Hash Value 2 for the pre-shared key from the Hash generation module 506. The Hash generation module 506 may generate the Hash Value 2 for the pre-shared key using the same Hash algorithm. The authentication module 514 may check whether the Hash Value 1 is equal to the Hash Value 2. If the Hash Value 1 and the Hash Value 2 for the pre-shared key are the same, the authentication module 514 may verify that the pre-shared key obtained is authentically transmitted from the storage medium 124, and the pre-shared key has not been changed, modified, or altered in transmission.

In some embodiments, during a communication between the controller 122 and another device (e.g., the storage medium 124), the authentication module 514 may need to verify that the communication is a "live" communication and there is no replay attack. For example, the controller 122 may obtain a binding history table from the storage medium 124. In order to ensure that the binding history table is indeed obtained from the "live" storage medium 124 (not from a third party who recorded the binding history table of the storage medium 124 and replay it to the controller 122), the controller 122 may transmit a nonce (generated by the nonce generation module 508) to the storage medium 124 at the beginning of the information exchange. The nonce may be used just once during the information exchange, and may be abandoned when the information exchange is finished. The controller 122 may then obtain a Hash Value 1 for the nonce from the storage medium 124. The authentication module 514 may check whether the Hash Value 1 is equal to a Hash Value 2 for the nonce that is generated by the Hash generation module 506. If the Hash Value 1 and the Hash Value 2 for the nonce are the same, the authentication module 514 may verify that the storage medium 124 communicating with the controller 122 is indeed a "live" communication partner of the controller 122.

In some embodiments, the controller 122 may be coupled to a first storage medium for the first time to form the storage device 120. When the storage device 120 (e.g., an SSD device) is powered on for the first time, the binding count corresponding to the controller 122 may be changed by incrementing its value. In some embodiments, the binding count corresponding to the controller 122 may be incremented by a pre-set value. The pre-set value may be a positive integer, and may be determined or adjusted by a user. Merely by way example, the pre-set value may be one, two, or three, etc. For example, each time the controller 122 is coupled to a new storage medium, the binding count corresponding to the controller 122 may be incremented by the pre-set value. As another example, the binding count corresponding to the controller 122 may be incremented by the pre-set value at a regular interval (e.g., every day, every month, every year, etc.). Detailed descriptions of changing the binding count corresponding to the controller 122 may be found elsewhere in the present disclosure (e.g., FIGS. 7-10 and the descriptions thereof).

In some embodiments, the binding count corresponding to the controller 122 may be counted by a counter in the controller 122. When the binding count corresponding to the controller 122 is incremented by the pre-set value, the value of the counter may be incremented by the pre-set value. The counter may be a binary counter, a decimal counter, or a hexadecimal counter, etc. In some embodiments, the counter may correspond to a maximum count value. When the binding count corresponding to the controller 122 reaches the maximum count value of the counter, the binding count corresponding to the controller 122 may not change anymore. Merely by way of example, the counter may be a 32-bit counter.

In some embodiments, the binding count corresponding to the controller 122 may be used to update a binding history table stored in a storage medium (e.g., the storage medium 124) that is coupled to the controller 122.

The components in the controller 122 may be connected to or communicate with each via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof.

It should be noted that the above description of the controller 122 is merely provided for the purposes of illustration, and is not intended to limit the scope of the present disclosure. For persons having ordinary skills in the art, multiple variations or modifications may be made under the teachings of the present disclosure. However, those variations and modifications may not depart from the scope of the present disclosure.

Figure 6:
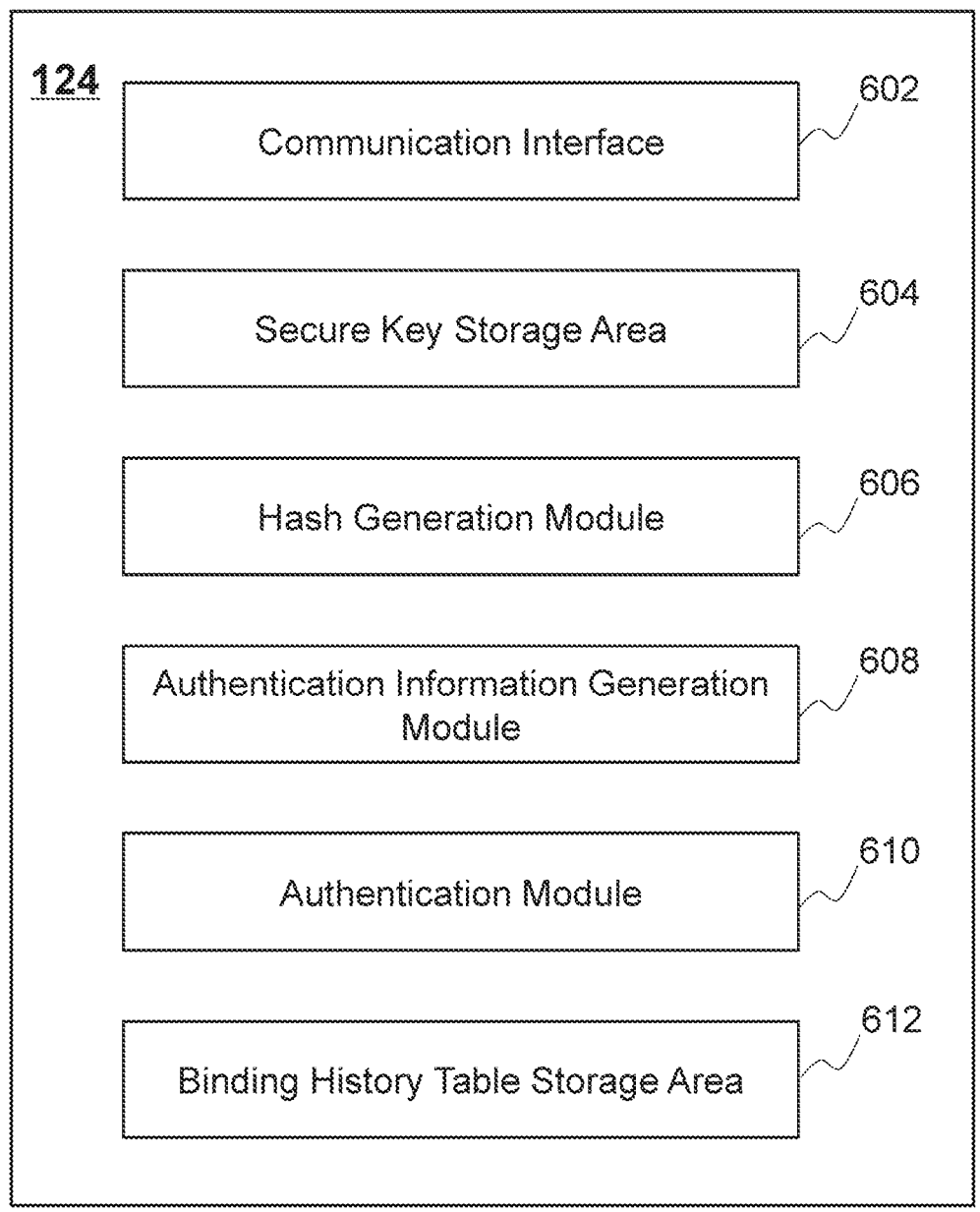
FIG. 6 is a block diagram illustrating an exemplary storage medium according to some embodiments of the present disclosure.

FIG. 6 is a block diagram illustrating an exemplary storage medium 124 according to some embodiments of the present disclosure. As illustrated in FIG. 6, the storage medium 124 may include a communication interface 602, a secure key storage area 604, a Hash generation module 606, an authentication information generation module 608, an authentication module 610, and a binding history table storage area 612.

The communication interface 602 may be configured to enable communication between the storage medium 124 and a controller, e.g., the controller 122. For example, the communication interface 602 may obtain a binding history table of the storage medium 124 from the binding history table storage area 612. The communication interface 602 may then transmit the binding history table to the controller 122 (e.g., the second communication interface 504). As another example, the communication interface 602 may obtain a secure key of the storage medium 124 (e.g., the public key of the storage medium 124) from the secure key storage area 604. The communication interface 602 may then transmit the secure key of the storage medium 124 to the controller 122. In some embodiments, the communication interface 602 may be an ONFI interface, or a toggle mode interface, etc.

The secure key storage area 604 may store one or more secure keys. The secure keys stored in the secure key storage area 604 may include the public key of the storage medium 124, the private key of the storage medium 124, the public key of the controller 122, a pre-shared key between the storage medium 124 and another device (e.g., the pre-shared key between the storage medium 124 and the controller 122), etc. In some embodiments, the secure key storage area 604 may transmit the public key of the storage medium 124 to the controller 122 via the communication interface 602, and keep the private key of the storage medium 124 in the secure key storage area 604.

In some embodiments, the storage medium 124 may generate a digital signature (e.g., a digital signature for a binding history table of the storage medium 124) using the private key of the storage medium 124, and transmit the digital signature to the controller 122. The digital signature may be verified by the controller 122 using the public key of the storage medium 124 obtained from the storage medium 124. Similarly, the storage medium 124 may also receive a digital signature (e.g., a digital signature for a binding history record of the controller 122) from the controller 122 that is generated by the controller 122 using the private key of the controller 122. The storage medium 124 may verify the digital signature from the controller 122 using the public key of the controller 122 stored in the secure key storage area 604.

Alternatively, in some embodiments, the storage medium 124 may generate a pre-shared key and share the pre-shared key with the controller 122. During the exchanges of data between the storage medium 124 and controller 122, the storage medium 124 may generate an MAC value (e.g., an MAC value for a binding history table of the storage medium 124) using the pre-shared key, and transmit the MAC value to the controller 122. Then, the MAC value may be verified by the controller 122 using the pre-shared key stored in, for example, the secure key storage area 510.

The Hash generation module 606 may generate a Hash value for data received from other components of the storage medium 124, or other components of the system 100. In some embodiments, the data may include, for example, a secure key (e.g., the public key of the storage medium 124, the public key of the controller 122, the pre-shared key between the storage medium 124 and the controller 122), a nonce (e.g., a nonce obtained from the controller 122), a binding history record obtained from the controller 122, etc. The data may be of arbitrary size, and the Hash value for the data may be a bit string of a fixed size (e.g., 256 bits, etc.). The Hash value for the data may uniquely represent the data. If the data is modified, the Hash value for the data may change accordingly. The Hash generation module 606 may generate the Hash value for the data using a Hash algorithm. Descriptions of the Hash algorithm may be found elsewhere in the present disclosure (e.g., in connection with FIG. 5 and the descriptions thereof).

The authentication information generation module 608 may generate authentication information for data transmitted by the storage medium 124. In some embodiments, the data transmitted by the storage medium 124 may include a binding history table of the storage medium 124. The authentication information for the binding history table may be transmitted to the controller 122 and be further used by the controller 122 to verify that the data generated by the storage medium 124 has not been changed, modified, or altered in transmission. In some embodiments, the authentication information may include a digital signature, an MAC value, etc. For example, the authentication information generation module 608 may generate a digital signature for data transmitted by the storage medium 124 using the private key of the storage medium 124 based on the Hash value for the data generated by the Hash generation module 606. Specifically, the Hash generation module 606 may firstly generate a Hash value for the data and then transmit the Hash value to the authentication information generation module 608. The authentication information generation module 608 may then digitally sign the Hash value using the private key of the storage medium 124 to generate the digital signature. In some embodiments, the authentication information generation module 608 may generate the digital signature using a digital signature algorithm such as an RSA algorithm, an elliptic curve digital signature algorithm (ECDSA), etc. As another example, the authentication information generation module 608 may generate an MAC value for data transmitted by the storage medium 124 using the pre-shared key between the storage medium 124 and the controller 122. Specifically, the data and the pre-shared key may be used as input to a Hash algorithm of the Hash generation module 506 to generate a Hash value. The authentication information generation module 608 may determine the Hash value as the MAC value for the data and transmit the MAC value to the controller 122.

The authentication module 610 may be configured to authenticate data obtained by the storage medium 124. In some embodiments, the data obtained by the storage medium 124 may include a binding history record of the controller 122. To authenticate the data, the authentication module 610 may verify that the data has not been changed, modified, or altered in transmission. The authentication module 610 may authenticate the data by verifying the authentication information for the data. The authentication information for the data may include a digital signature, or an MAC value, etc. For example, the storage medium 124 may obtain a binding history record signed with a digital signature from the controller 122. The digital signature of the binding history record may be generated by the controller 122 using the private key of the controller 122 according to a signature generation process. The authentication module 610 may verify the digital signature using the public key of the controller 122 according to a signature verification process. In some embodiments, the authentication module 610 may verify that the binding history record is authentically transmitted from the controller 122, and the binding history record has not been changed, modified, or altered in transmission. In some embodiments, the authentication module 610 may verify that the obtained binding history record is false. In this case, the storage medium 124 may discard the obtained binding history record.

As another example, the storage medium 124 may obtain a binding history record and an MAC value for the binding history record from the controller 122. The MAC value for the binding history record may be generated by performing a Hash algorithm on the binding history record and the pre-shared key between the storage medium 124 and the controller 122. To authenticate the binding history record, the authentication module 610 may verify the MAC value using the pre-shared key between the storage medium 124 and the controller 122 stored in the secure key storage area 604. Specifically, the MAC value verification process may include a series of operations. The authentication module 610 may firstly obtain a new MAC value for the binding history record. The new MAC value may be generated by the Hash generation module 606 by performing the same Hash algorithm on the binding history record and the pre-shared key stored in the secure key storage area 604. The authentication module 610 may then check whether the new MAC value is equal to the MAC value obtained from the controller 122. If the new MAC value is equal to the MAC value obtained from the controller 122, the authentication module 610 may verify that the binding history record has not been changed, modified, or altered in transmission. If the new MAC value is not equal to the MAC value obtained from the controller 122, the authentication module 610 may verify that the binding history record obtained by the storage medium 124 is false. In this case, the storage medium 124 may discard the obtained binding history record.

As described above, the public key of the controller 122 may be used by the storage medium 124 during the digital signature verification process. The public key of the controller 122 may be obtained by the storage medium 124 before the digital signature verification process. In some embodiments, the authentication module 610 may also authenticate the public key of the controller 122 obtained by the storage medium 124. For example, the authentication module 610 may obtain a Hash Value 1 for the public key of the controller 122 from the controller 122. The Hash Value 1 may be generated by the controller 122 using a Hash algorithm. The authentication module 610 may then obtain a Hash Value 2 for the public key of the controller 122 from the Hash generation module 606. The Hash generation module 606 may generate the Hash Value 2 based on the public key of the controller 122 using the same Hash algorithm. The authentication module 610 may check whether the Hash Value 1 is equal to the Hash Value 2. If the Hash Value 1 and the Hash Value 2 are the same, the authentication module 610 may verify that the obtained public key of the controller 122 is authentically transmitted from the controller 122, and the public key of the controller 122 has not been changed, modified, or altered in transmission. Similarly, the pre-shared key between the controller 122 and the storage medium 124 may be used during the MAC value verification process. In some embodiments, the authentication module 610 may authenticate the pre-shared key obtained by the storage medium 124. For example, the authentication module 610 may obtain a Hash Value 1 for the pre-shared key from the controller 122. The Hash Value 1 may be generated by the controller 122 using a Hash algorithm. The authentication module 610 may then obtain a Hash Value 2 for the pre-shared key from the Hash generation module 606. The Hash generation module 606 may generate the Hash Value 2 based on the pre-shared key using the same Hash algorithm. The authentication module 610 may check whether the Hash Value 1 is equal to the Hash Value 2. If the Hash Value 1 and the Hash Value 2 are the same, the authentication module 610 may verify that the pre-shared key obtained is authentically transmitted from the controller 122, and the pre-shared key has not been changed, modified, or altered in transmission.

The binding history table storage area 612 may store a binding history table associated with the storage medium 124. The binding history table may be used to record information of one or more controllers that were previously coupled to (e.g., physically connected to) the storage medium 124. In some embodiments, the binding history table associated with the storage medium 124 may record the information of each distinctive controller that has been coupled to the storage medium 124. In some embodiments, the binding history table may include one or more rows (e.g., 2 rows, 3 rows, 4 rows, 8 rows, 32 rows). Each time the storage medium 124 is coupled to a distinctive controller, the binding history table may record the information of the distinctive controller in a row of the binding history table. The row may be used to record various information of a controller, such as, the ID number (e.g., the product number, the serial number) of the controller and a binding count corresponding to the controller. The ID number of the controller may uniquely represent the controller. The ID number of the controller may include a plurality of bits, e.g., 16 bits, 32 bits, 64 bits, etc. The binding count corresponding to the controller may indicate how many times the storage medium has been coupled to (e.g., registered with) that controller. The binding count corresponding to the controller may be counted by a counter in the storage medium 124. The counter may be a binary counter, a decimal counter, or a hexadecimal counter, etc. In some embodiments, the counter may have a maximum count value. When the binding count corresponding to the controller reaches the maximum count value of the counter, the binding count corresponding to the controller may not be changed anymore. Merely by way of example, the counter may be a 32-bit counter.

In some embodiments, the binding history table may include information of one or more controllers including, for example, the one or more ID numbers of the one or more controllers, the one or more binding counts corresponding to the one or more controllers, etc. In some embodiments, the binding history table may be empty, which means that no controller has ever been coupled to (e.g., physically connected to) the storage medium 124.

In some embodiments, the binding history table associated with the storage medium 124 may be updated. In some embodiments, the controller may be coupled to the storage medium 124 for the first time to form the storage device. When the storage device (e.g., an SSD device) is powered on for the first time, the binding history table in the storage medium 124 may be updated accordingly. A binding history record corresponding to the controller may be transmitted from the controller to the storage medium 124. The binding history record corresponding to the controller may include the ID number of the controller and the binding count corresponding to the controller. Then, the binding history table associated with the storage medium 124 may be updated based on the binding history record corresponding to the controller. For example, the data included in the binding history record corresponding to the controller may be added to an empty row in the binding history table. Detailed descriptions of the update of the binding history table associated with the storage medium 124 will be found in FIGS. 7-10 and the descriptions thereof.

In some embodiments, the binding history table associated with the storage medium 124 may be used to evaluate the storage medium 124. For example, the binding history table may be used to determine whether the storage medium 124 is a second-hand storage medium (as will be described in FIGS. 7-10 and the descriptions thereof).

In some embodiments, the storage medium 124 may include a storage area or a storage module to store the ID number of the storage medium 124. The ID number of the storage medium 124 may be used to uniquely represent the storage medium 124. In some embodiment, the ID number of the storage medium 124 may include a product number of the storage medium 124, a serial number of the storage medium 124, etc. The ID number of the storage medium 124 may include a plurality of bits, for example, 16 bits, 32 bits, or 64 bits, etc.

The components in the storage medium 124 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof.

It should be noted that the above description of the storage medium 124 is merely provided for the purposes of illustration, and is not intended to limit the scope of the present disclosure. For persons having ordinary skills in the art, multiple variations or modifications may be made under the teachings of the present disclosure. However, those variations and modifications may not depart from the scope of the present disclosure.

Figure 7:
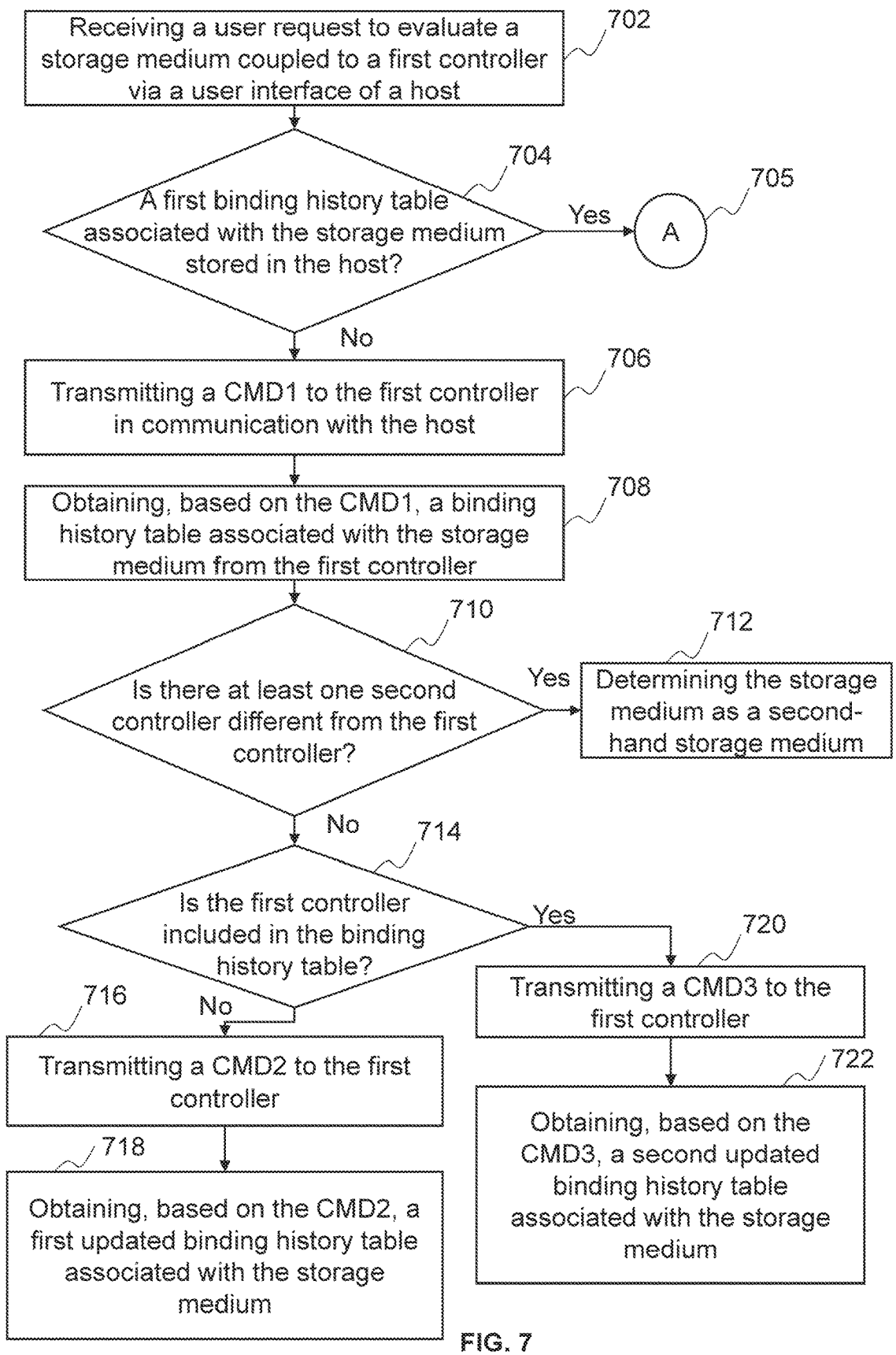
FIG. 7 and FIG. 8 illustrate a flowchart illustrating an exemplary process for evaluating a storage medium at least by a host according to some embodiments of the present disclosure.
Figure 8:
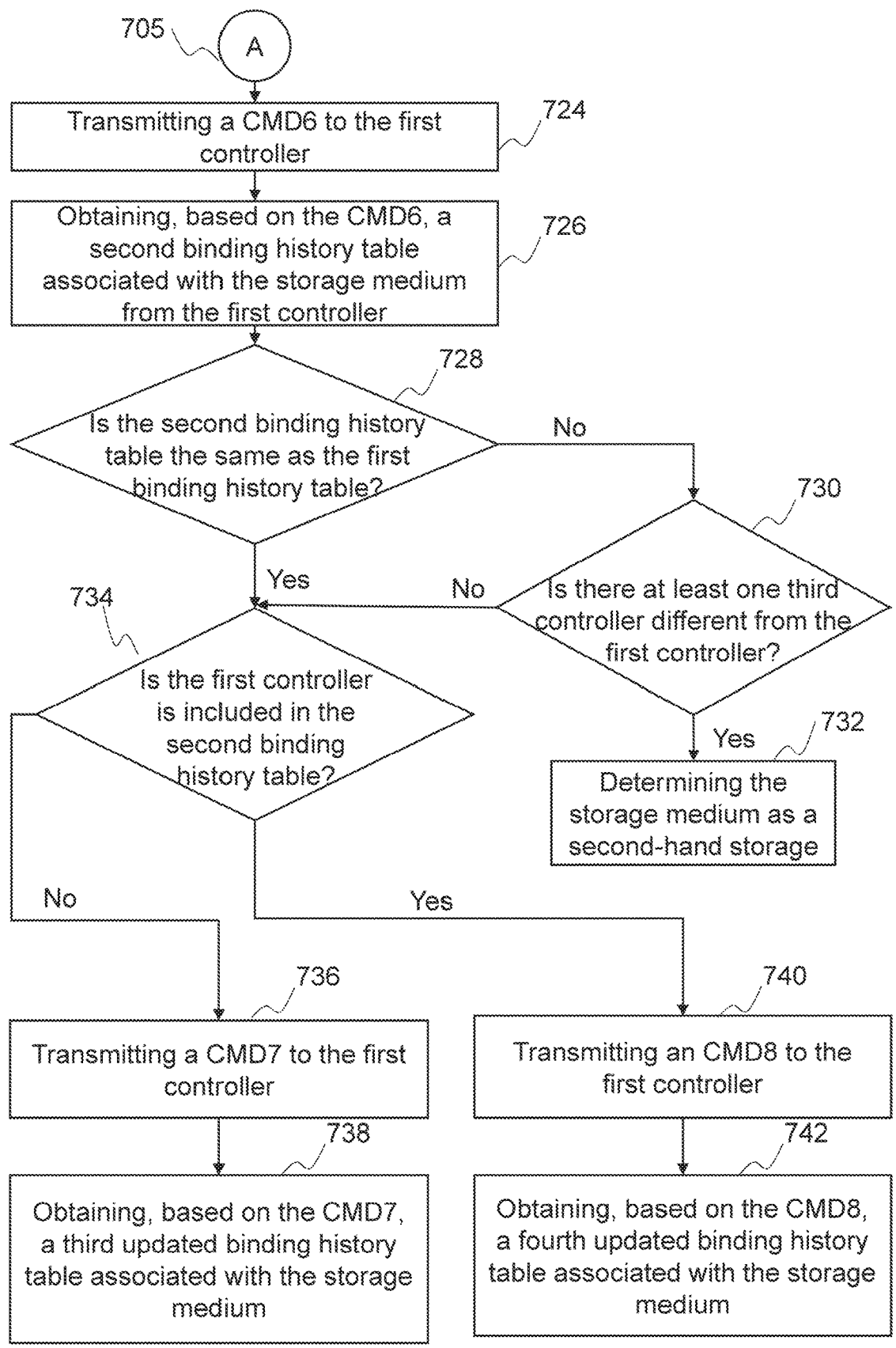

FIG. 7 and FIG. 8 illustrate a flowchart illustrating an exemplary process 700 for evaluating a storage medium at least by a host according to some embodiments of the present disclosure. In some embodiments, the process 700 may be executed by the system 100. For example, the process 700 may be implemented by the host 110.

In 702, the host 110 may receive a user request to evaluate a storage medium coupled to a first controller via a user interface of the host 110. For illustration purpose, the controller 122 as illustrated in FIG. 5 may be regarded as an example of the first controller, and the storage medium 124 as illustrated in FIG. 6 may be regarded as an example of the storage medium.

The storage medium may be coupled to (e.g., physically connected to) the first controller to form a storage device (e.g., an SSD device). The storage device may be connected to the host 110 (e.g., via an SATA interface) and powered on. The host 110 may receive a user request to evaluate the storage medium (e.g., the storage medium 124) in the storage device via the user interface (e.g., the user interface 402) of the host 110. In some embodiments, the user request may be used to open a user application that is used to evaluate the storage medium. In response to the user request, the host 110 may perform operations to evaluate the storage medium. In some embodiments, the user interface of the host 110 may receive the user request via, for example, a mouse. The user request may be generated by clicking on one or more icons related to the user application of the host 110.

In 704, the host 110 (e.g., the processing module 404) may determine whether there is a first binding history table associated with the storage medium stored in the host 110. For example, the host 110 may determine whether there is a first binding history table associated with the storage medium stored in a protected area in the host 110, for example, a protected area in the user application (the user application used to evaluate the storage medium) of the host 110. The protected area may include for example, a registry of the host 110.

In some embodiments, the host 110 may perform the process 700 to evaluate the storage medium more than once. There may be a possibility that the host 110 may obtain the first binding history table of the storage medium during one or more previous processes 700 and store the obtained first binding history table in it. Therefore, the host 110 may need to determine whether there is the first binding history table associated with the storage medium already stored in it (e.g., stored in the registry of the user application in the host 110).

In response to a determination that there is the first binding history table stored in the host 110, the host 110 may proceed to node A 705 and perform at least some of operations starting from node A 705 illustrated in FIG. 8. In response to a determination that there is no binding history table stored in the host 110, the host 110 may execute operation 706.

In 706, the host 110 (e.g., the user interface 402) may transmit a first command (also referred to as "CMD1") to the first controller in communication with the host 110. For example, the host 110 may transmit a CMD1 to the first controller via the first communication interface 502 (as illustrated in FIG. 5). The CMD1 may be generated by the host 110 based on the user request to evaluate the storage medium. The CMD1 may be consistent with a protocol used between the host 110 and the storage device (e.g., the first controller of the storage device). In some embodiments, the protocol may be the NVMe protocol, or the MCI protocol, etc.

In 708, the host 110 (e.g., the user interface 402) may obtain, based on the CMD1, a binding history table associated with the storage medium from the first controller. The CMD1 may be translated by the first controller into a command that can be understood by the storage medium (e.g., the command may be consistent with the communication protocol used between the first controller and the storage medium). The CMD1 may direct the first controller to retrieve the binding history table from the storage medium. The host 110 may then obtain the binding history table from the first controller.

The binding history table associated with the storage medium may be used to record information of one or more controllers that were previously coupled to the storage medium (if any) and/or the controller that is currently coupled to the storage medium. As described elsewhere in the present disclosure, each time the storage medium couples to a distinctive controller, the binding history table associated with the storage medium may record the information of the distinctive controller in the binding history table. In some embodiments, the binding history table may include one or more rows (e.g., 2 rows, 3 rows, 4 rows, 8 rows, 32 rows). Each time the storage medium couples to a distinctive controller, the binding history table may record the information of the distinctive controller in a row of the binding history table. Exemplary information of the controller may include, for example, the ID number (e.g., the product number, the serial number) of the controller, or a binding count corresponding to the controller as described elsewhere in the present disclosure.

In some embodiments, the host 110 may also obtain, based on the CMD1, the ID number of the storage medium from the storage medium through the first controller. The ID number of the storage medium may be used to identify the storage medium along with the binding history table associated with storage medium.

In 710, the host 110 (e.g., the processing module 404) may determine whether there is at least one second controller in the binding history table different from the first controller. In some embodiments, the host 110 may compare the ID number(s) corresponding to the controller(s) included in the binding history table (if any) with the ID number of the first controller. If there is at least one ID number different from the ID number of the first controller, the host 110 may determine that there is at least one second controller in the binding history table.

In 712, in response to a determination that there is at least one second controller in the binding history table different from the first controller, the host 110 may determine that the storage medium has been coupled to one or more other controllers before, which means that the storage medium is a second-hand storage medium. In some embodiments, the host 110 may display a warning message on the user interface 402 to warn the user that the storage medium in the storage device is a second-hand storage medium.

In response to a determination that there is no second controller in the binding history table different from the first controller, the host 110 may execute operation 714.

In 714, the host 110 (e.g., the processing module 404) may determine whether the first controller is included in the binding history table. For example, the host 110 may determine whether the ID number of the first controller is included in the binding history table. In response to a determination that the first controller is not included in the binding history table (e.g., the ID number of the first controller is not included in the binding history table), the host 110 may execute operation 716. In response to a determination that the first controller is already in the binding history table, the host 110 may execute operation 720.

In 716, the host 110 (e.g., the processing module 404) may transmit a second command (also referred to as "CMD2") to the first controller. The CMD2 may be generated by the host 110. The CMD2 may be consistent with a protocol (e.g., the NVMe protocol, or the AHCI protocol) used between the host 110 and the first controller.

In 718, the host 110 (e.g., the processing module 404) may obtain, based on the CMD2, a first updated binding history table associated with the storage medium. The CMD2 may be translated by the first controller into a command that can be understood by the storage medium (e.g., the command may be consistent with the communication protocol used between the first controller and the storage medium).

In some embodiments, the first updated binding history table may be generated by adding a new binding history record corresponding to the first controller to the existing binding history table of the storage medium. For example, the new binding history record corresponding to the first controller may be added to an empty row in the binding history table to generate the first updated binding history table. The new binding history record corresponding to the first controller may be generated by the first controller and transmitted from the first controller to the storage medium. In some embodiments, the new binding history record corresponding to the first controller may include the ID number of the first controller and a new binding count corresponding to the first controller.

In some embodiments, the new binding count corresponding to the first controller in the new binding history record may be set as a non-zero value, which may indicate that it is the first time for the first controller to be coupled to a storage medium.

In some embodiments, the new binding count corresponding to the first controller in the new binding history record may be generated by incrementing a binding count corresponding to the first controller (e.g., a binding count that is not less than one) by a pre-set value (e.g., one, two, or three), which may indicate that the first controller has been coupled to one or more other storage media before it is coupled to this storage medium. In some embodiments, if the binding count corresponding to the first controller reaches the maximum count value of the counter in the first controller, the binding count corresponding to the first controller may not be changed.

During the generation of the first updated binding history table, the storage medium may further determine whether the new binding count corresponding to the first controller in the new binding history record exceeds the maximum count value of the counter in the storage medium. If the new binding count corresponding to the first controller in the new binding history record does not exceed the maximum count value of the counter in the storage medium, the new binding history record may be directly added to an empty row in the binding history table to generate the first updated binding history table. If the new binding count corresponding to the first controller in the new binding history record exceeds the maximum count value of the counter in the storage medium, the new binding count corresponding to the first controller in the new binding history record may be rejected by the storage medium. In this case, to generate the first updated binding history table, the binding count corresponding to the first controller in the first updated binding history table may be set to a random value that is between one and the maximum count value.

By implementing operation 718, the first controller (e.g., the ID number of the first controller, the binding count corresponding to the first controller) may be included in the first updated binding history table associated with the storage medium.

In 720, the host 110 (e.g., the processing module 404) may transmit a third command (also referred to as "CMD3") to the first controller. The CMD3 may be generated by the host 110. The CMD3 may be consistent with a protocol (e.g., the NVMe protocol, or the AHCI protocol) used between the host 110 and the first controller.

In 722, the host 110 (e.g., the processing module 404) may obtain, based on the CMD3, a second updated binding history table associated with the storage medium. The CMD3 may be translated by the first controller into a command that can be understood by the storage medium (e.g., the command may be consistent with the communication protocol used between the first controller and the storage medium).

The second updated binding history table may be generated based on an updated binding history record corresponding to the first controller.

The updated binding history record corresponding to the first controller may be generated by the first controller or the host. The updated binding history record may include the ID number of the first controller and an updated binding count corresponding to the first controller. The updated binding count corresponding to the first controller may be generated by incrementing a binding count (i.e., a current binding count that is not less than one) corresponding to the first controller by a pre-set value. The pre-set value may be a positive integer, and may be determined or adjusted by the host 110. Merely by way of example, the pre-set value may be one, two, or three, etc. In some embodiments, if the binding count corresponding to the first controller reaches the maximum count value of the counter in the first controller, the binding count corresponding to the first controller may not be changed.

The updated binding history record corresponding to the first controller may be then transmitted from the first controller to the storage medium. After obtaining the updated binding history record from the first controller, the storage medium may update the binding count corresponding to the first controller in the binding history table. In some embodiments, if the updated binding count corresponding to the first controller in the updated binding history record does not exceed the maximum count value of the corresponding counter in the storage medium, the storage medium may replace the existing binding count corresponding to the first controller in the binding history table with the updated binding count. In some embodiments, if the updated binding count corresponding to the first controller in the updated binding history record exceeds the maximum count value of the corresponding counter in the storage medium, the storage medium may reject the updated binding count. The existing binding count corresponding to the first controller in the binding history table may not be changed or updated.

In 724, as illustrated in FIG. 8, the host 110 (e.g., the processing module 404) may transmit a sixth command (also referred to as "CMD6") to the first controller in response to the determination that there is the first binding history table stored in the host 110. The CMD6 may be generated by the host 110. The CMD6 may be consistent with a protocol (e.g., the NVMe protocol, or the MCI protocol) between the host 110 and the first controller. In some embodiments, the CMD6 may be similar to or same as the CMD1 as described elsewhere in the present disclosure.

In 726, the host 110 (e.g., the processing module 404) may obtain, based on the CMD6, a second binding history table associated with the storage medium from the first controller. The CMD6 may be translated by the first controller into a command that can be understood by the storage medium (e.g., the command may be consistent with the communication protocol used between the first controller and the storage medium). The CMD6 may direct the first controller to obtain the second binding history table from the storage medium. In some embodiments, the host 110 may also obtain, based on the CMD6, the ID number of the storage medium that is used to identify the storage medium along with the second binding history table associated with storage medium.

In 728, the host 110 (e.g., the processing module 404) may determine whether the second binding history table is the same as the first binding history table.

In response to a determination that the second binding history table is different from the first binding history table, the host 110 may execute operation 730. The host 110 may also display a warning message on the user interface 402 (e.g., a display, a touchscreen, etc.) to warn the user that the storage medium may have been manipulated by a third party or the protected area in the host 110 (e.g., the protected area that stores the first binding history table) may has been tampered. In response to a determination that the second binding history table is the same as the first binding history table, the host 110 may execute operation 734.

In 730, the host 110 (e.g., the processing module 404) may determine whether there is at least one third controller in the second binding history table different from the first controller.

In 732, the host 110 may determine that the storage medium has been coupled to other controllers (e.g., the at least one third controller) before. That is, the host 110 may determine the storage medium in the storage device as a second-hand storage medium. In some embodiments, in this case, the host 110 may display a warning message on the user interface 402 to warn the user that the storage medium in the storage device is a second-hand storage medium.

In 734, the host 110 (e.g., the processing module 404) may determine whether the first controller is included in the second binding history table. For example, the host 110 may determine whether the ID number of the first controller is included in the second binding history table. In response to a determination that the first controller is not included in the second binding history table, the host 110 may execute operation 736. In some embodiments, that the first controller is not included in the second binding history table may be caused by the process in which the obtaining of the second history table is not performed correctly due to an interruption (e.g., the storage device is disconnected to the host 110 during the process). In response to a determination that the first controller is already in the second binding history table, the host 110 may execute operation 740.

In 736, the host 110 (e.g., the processing module 404) may transmit a seventh command (also referred to as "CMD7") to the first controller. The CMD7 may be generated by the host 110. The CMD7 may be consistent with a protocol (e.g., the NVMe protocol, or the AHCI protocol) used between the host 110 and the first controller. In some embodiments, the CMD7 may be similar to or same as the CMD2 as described elsewhere in the present disclosure.

In 738, the host 110 (e.g., the processing module 404) may obtain, based on the CMD7, a third updated binding history table associated with the storage medium. The CMD7 may be translated by the first controller into a command that can be understood by the storage medium (e.g., the command may be consistent with the communication protocol used between the first controller and the storage medium).

The third updated binding history table may be generated by adding a new binding history record corresponding to the first controller to the second binding history table. For example, the new binding history record corresponding to the first controller may be added to an empty row in the second binding history table to generate the third updated binding history table. The new binding history record corresponding to the first controller may be generated by the first controller and transmitted to the storage medium. The new binding history record corresponding to the first controller may include the ID number of the first controller and a new binding count corresponding to the first controller.

In some embodiments, the new binding count corresponding to the first controller in the new binding history record may be set as a non-zero value, which may indicate that it is the first time for the first controller to connect to a storage medium.

In some embodiments, the new binding count corresponding to the first controller in the new binding history record may be generated by incrementing a binding count corresponding to the first controller (a binding count that is not less than one) by a pre-set value (e.g., one, two, or three, etc.), which may indicate that the first controller has been coupled to one or more other storage media before the first controller is coupled to this storage medium. In some embodiments, if the binding count corresponding to the first controller reaches the maximum count value of the counter in the first controller, the binding count corresponding to the first controller may not be changed, and thus the new binding count corresponding to the first controller may be equal to the maximum count value. Further, the storage medium may determine whether the new binding count corresponding to the first controller in the new binding history record exceeds the maximum count value of the corresponding counter in the storage medium. If the new binding count corresponding to the first controller in the new binding history record does not exceed the maximum count value of the corresponding counter in the storage medium, the new binding history record may be directed added to an empty row in the second binding history table to generate the third updated binding history table. If the new binding count corresponding to the first controller in the new binding history record exceeds the maximum count value of the corresponding counter in the storage medium, the new binding count corresponding to the first controller in the new binding history record may be rejected by the storage medium. In this case, the binding count corresponding to the first controller may be set to a random value, which is between one and the maximum count value, in the third updated binding history table.

By implementing operation 738, the first controller (e.g., the ID number of the first controller, the binding count corresponding to the first controller) may be included in the third updated binding history table associated with the storage medium.

In 740, the host 110 (e.g., the processing module 404) may transmit an eighth command (also referred to as "CMD8") to the first controller. The CMD8 may be generated by the host 110. The CMD8 may be consistent with a protocol (e.g., the NVMe protocol, or the AHCI protocol) between the host 110 and the first controller. In some embodiments, the CMD8 may be similar to or same as the CMD3 as described elsewhere in the present disclosure.

In 742, the host 110 (e.g., the processing module 404) may obtain, based on the CMD8, a fourth updated binding history table associated with the storage medium. The CMD8 may be translated by the first controller into a command that can be understood by the storage medium (e.g., the command may be consistent with the communication protocol used between the first controller and the storage medium).

The fourth updated binding history table may be generated based on an updated binding history record corresponding to the first controller. The updated binding history record corresponding to the first controller may be generated by the first controller. The updated binding history record corresponding to the first controller may include the ID number of the first controller and an updated binding count corresponding to the first controller. The updated binding count corresponding to the first controller may be generated by incrementing a binding count (i.e., a current binding count that is not less than one) corresponding to the first controller by a pre-set value. The pre-set value may be a positive integer, and may be determined or adjusted by the host 110 Merely by way of example, the pre-set value may be one, two, or three, etc. In some embodiments, if the binding count corresponding to the first controller reaches the maximum count value of the counter in the first controller, the binding count corresponding to the first controller may not be changed. In this case, the updated binding count corresponding to the first controller in the updated binding history record is equal to the maximum count value of the counter in the first controller.

The updated binding history record corresponding to the first controller may be transmitted from the first controller to the storage medium. The storage medium may retrieve the existing binding count corresponding to the first controller in the second binding history table. In some embodiments, if the updated binding count corresponding to the first controller in the updated binding history record does not exceed the maximum count value of the corresponding counter in the storage medium, the storage medium may replace the existing binding count corresponding to the first controller in the second binding history table with the updated binding count to generate the fourth updated binding history table. In some embodiments, if the updated binding count corresponding to the first controller in the updated binding history record exceeds the maximum count value of the corresponding counter in the storage medium, the storage medium may reject the updated binding count, and the existing binding count corresponding to the first controller in the second binding history table may not be changed or updated. In this case, the fourth updated binding history table may be same as the second binding history table.

By performing the process 700 as described above, the host 110 may evaluate the storage medium to determine whether the storage medium in the storage device (including the storage medium and the first controller) is a second-hand storage medium. In some embodiments, during the process 700, cryptographic services may be provided to encrypt/decrypt the information exchanged during the process 700. The cryptographic services may be provided with one or more commands (e.g., the CMD1, the CMD2, etc.) generated in the process 700 and may be provided between the first controller and the storage medium. Detailed descriptions of exemplary cryptographic services will be found in FIG. 9 and/or FIG. 10 and the descriptions thereof.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 720 and 722 may be optional, and may be omitted from the process 700. As another example, operations 740 and 742 may be optional, and may be omitted from the process 700.

Figure 9:
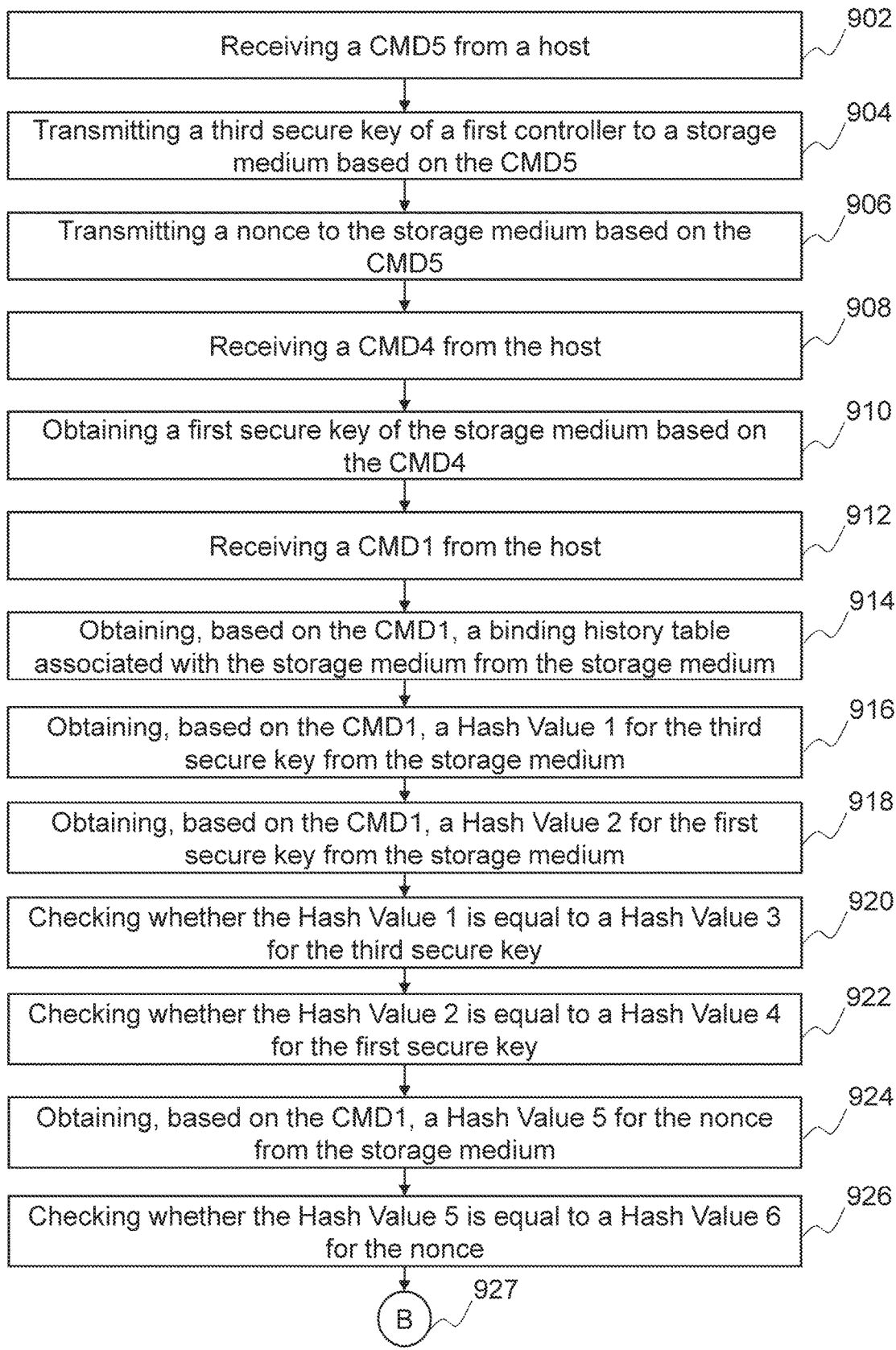
FIG. 9 and FIG. 10 illustrate a flowchart illustrating an exemplary process for evaluating a storage medium at least by a controller according to some embodiments of the present disclosure.
Figure 10:
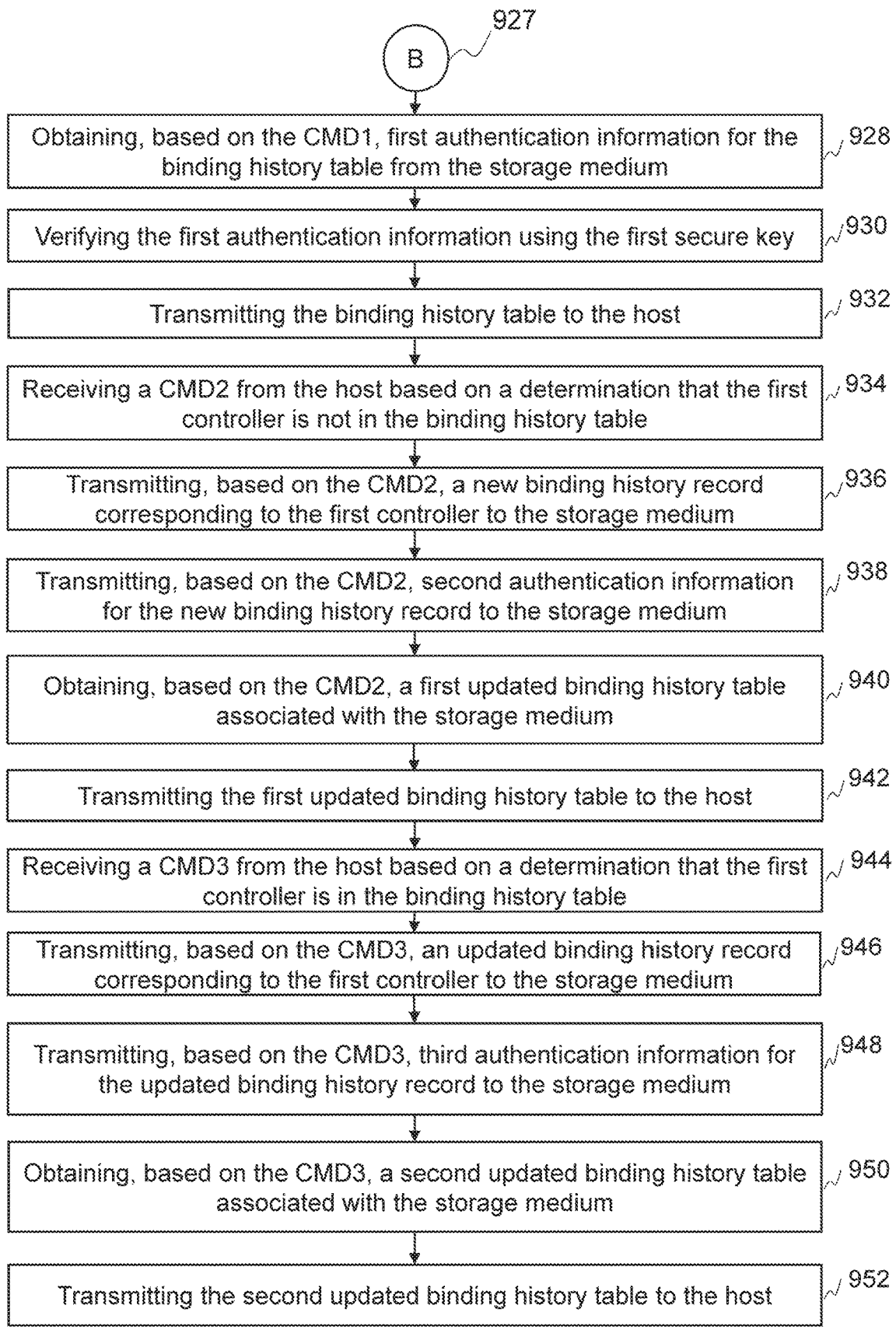

FIG. 9 and FIG. 10 illustrate a flowchart illustrating an exemplary process 900 for evaluating a storage medium at least by a controller according to some embodiments of the present disclosure. In some embodiments, the process 900 may be executed by the system 100. For example, the process 900 may be implemented by the controller 122.

In 902, the controller 122 (e.g., the first communication interface 502) may receive a fifth command (also referred to as "CMD5") from a host. The controller 122 may be coupled to a storage medium, and the controller 122 and the storage medium may form a storage device (e.g., an SSD device).

In some embodiments, the controller 122 may receive the CMD5 from the host via the communication interface 406 (as illustrated in FIG. 4). The CMD5 may be generated by the host and may be consistent with a protocol (e.g., the NVMe protocol, or the MCI protocol) used between the host and the storage device (e.g., the controller 122 of the storage device). In some embodiments, the CMD5 may be generated based on a user request to evaluate the storage medium. In some embodiments, the user request may be used to open a user application of the host to evaluate the storage medium. The user application may be used to evaluate the storage medium. More descriptions of the user request may be found elsewhere in the present disclosure (e.g., FIG. 4, FIG. 7 and/or FIG. 8 and the descriptions thereof).

In 904, the controller 122 (e.g., the second communication interface 504) may transmit its third secure key to the storage medium based on the CMD5. For brevity, the process 900 may take the public-key cryptography as an example. It should be noted that the public-key cryptography is merely provided for the purposes of illustration, and not intended to limit the scope of the present disclosure. For persons having ordinary skills in the art, the methods and/or systems described in the present disclosure may be applied to other similar situations, such as the symmetric key cryptography, etc. The third secure key may be the public key of the controller 122 that is stored in the secure key storage area 510 (as illustrated in FIG. 5). The controller 122 may transmit the public key of the controller 122 to the storage medium based on the CMD5.

In 906, the controller 122 (e.g., the second communication interface 504) may transmit a nonce to the storage medium based on the CMD5. The nonce may be generated by the nonce generation module 508 of the controller 122 (as illustrated in FIG. 5). The nonce may include a random or pseudo random number, text, codes, etc. More descriptions of the nonce may be found elsewhere in the present disclosure (e.g., the nonce generation module 508 and the descriptions thereof). In some embodiments, the nonce may be used only once and may be abandoned after the process 900 is completed.

In 908, the controller 122 (e.g., the first communication interface 502) may receive a CMD4 from the host. The CMD4 may be generated by the host and may be consistent with a protocol (e.g., the NVMe protocol, or the MCI protocol) used between the host and the storage device.

In 910, the controller 122 (e.g., the second communication interface 504) may obtain a first secure key of the storage medium based on the CMD4. The first secure key may be the public key of the storage medium. In some embodiments, the controller 122 may obtain the public key of the storage medium from the storage medium via the communication interface 602 (as illustrated in FIG. 6). In some embodiments, the public key of the storage medium may be stored in a publicly available database provided by, for example, the vendor of the storage medium. The controller 122 may obtain the public key of the storage medium from the publicly available database.

In 912, the controller 122 (e.g., the first communication interface 502) may receive a CMD1 from the host. The CMD1 herein may be similar to the CMD1 illustrated in operation 706 of the process 700, and the description is not repeated.

In 914, the controller 122 (e.g., the second communication interface 504) may obtain, based on the CMD1, a binding history table associated with the storage medium from the storage medium.

The binding history table associated with the storage medium may be used to record information of one or more controllers that were previously coupled to the storage medium (if any) and/or the controller that is currently coupled to the storage medium. As described elsewhere in the present disclosure, each time the storage medium couples to a distinctive controller, the binding history table associated with the storage medium may record the information of the distinctive controller in the binding history table. In some embodiments, the binding history table may include one or more rows (e.g., 2 rows, 3 rows, 4 rows, 8 rows, 32 rows). Each time the storage medium couples to a distinctive controller, the binding history table may record the information of the distinctive controller in a row of the binding history table. Exemplary information of the controller may include, for example, the ID number (e.g., the product number, the serial number) of the controller, or a binding count corresponding to the controller as described elsewhere in the present disclosure.

In some embodiments, the controller 122 may also obtain, based on the CMD1, the ID number of the storage medium from the storage medium. The ID number of the storage medium may be used to identify the storage medium along with the binding history table associated with storage medium.

In 916, the controller 122 (e.g., the second communication interface 504) may obtain, based on the CMD1, a Hash Value 1 for the third secure key from the storage medium. The third secure key may be the public key of the controller 122. The Hash Value 1 may be generated by the storage medium (e.g., the Hash generation module 606 as illustrated in FIG. 6) using the public key of the controller 122 transmitted to the storage medium.

In 918, the controller 122 (e.g., the second communication interface 504) may obtain, based on the CMD1, a Hash Value 2 for the first secure key from the storage medium. The first secure key may be the public key of the storage medium. The Hash Value 2 may be generated by the storage medium (e.g., the Hash generation module 606 as illustrated in FIG. 6) using the public key of the storage medium.

In 920, the controller 122 (e.g., the authentication module 514) may check whether the Hash Value 1 is equal to a Hash Value 3 for the third secure key. The Hash Value 3 may be generated by the controller 122 (e.g., the Hash generation module 506 as illustrated in FIG. 5) using the public key of the controller 122. If the Hash Value 1 is equal to the Hash Value 3, the controller 122 may verify that the third secure key (i.e., the public key of the controller 122) has not been changed, modified, or altered in transmission (e.g., during the transmission from the controller 122 to the storage medium). If the Hash Value 1 is not equal to the Hash Value 3, the controller 122 may determine that the third secure key (i.e., the public key of the controller 122) was not transmitted correctly.

In 922, the controller 122 (e.g., the authentication module 514) may check whether the Hash Value 2 is equal to a Hash Value 4 for the first secure key. The Hash Value 4 may be generated by the controller 122 (e.g., the Hash generation module 506 as illustrated in FIG. 5) using the public key of the storage medium transmitted from the storage medium. If the Hash Value 2 is equal to the Hash Value 4, the controller 122 may verify that the first secure key (i.e., the public key of the storage medium) obtained by the controller 122 has not been changed, modified, or altered in transmission (e.g., during the transmission from the storage medium to the controller 122). If the Hash Value 2 is not equal to the Hash Value 4, the controller 122 may determine that the first secure key (i.e., the public key of the storage medium) obtained by the controller 122 is false. In this case, the controller 122 may discard the first secure key.

In 924, the controller 122 (e.g., the second communication interface 504) may obtain, based on the CMD1, a Hash Value 5 for the nonce from the storage medium. The Hash Value 5 may be generated by the storage medium (e.g., the Hash generation module 606) using the nonce transmitted from the controller 122 (illustrated in operation 906).

In 926, the controller 122 (e.g., the authentication module 514) may check whether the Hash Value 5 is equal to a Hash Value 6 for the nonce. The Hash Value 6 may be generated by the controller 122 (e.g., the Hash generation module 506 as illustrated in FIG. 5) using the nonce. If the Hash Value 5 is equal to the Hash Value 6, the controller 122 may verify that the storage medium communicating with the controller 122 is indeed a "live" communication partner. The controller 122 may verify that there is no replay attack during the information exchange (e.g., the exchange of the secure keys, the exchange of the binding history table, etc.) between the controller 122 and the storage medium. If the Hash Value 5 is not equal to the Hash Value 6, the controller 122 may determine that there may be a replay attack during the communication between the controller 122 and the storage medium, e.g., there may be a third party who recorded the exchanged information (e.g., a binding history table associated with the storage medium) in a previous communication and replay it to the controller 122 in the current communication between the controller 122 and the storage medium.

The controller 122 may then proceed to node B 927 and perform at least some of operations starting from node B 927 illustrated in FIG. 10.

In 928, the controller 122 (e.g., the second communication interface 504) may obtain, based on the CMD1, first authentication information for the binding history table from the storage medium. The first authentication information may be generated by the storage medium using a second secure key of the storage medium. For example, the second secure key may be the private key of the storage medium and the first authentication information for the binding history table may be a digital signature for the binding history table. The digital signature for the binding history table may be generated by the storage medium (e.g., the authentication information generation module 608 illustrated in FIG. 6) based on the private key of the storage medium and the binding history table using a digital signature algorithm (e.g., the RSA algorithm, or the ECDSA). Detailed descriptions regarding the digital signature may be found elsewhere in the present disclosure (e.g., in connection with the authentication information generation module 608 illustrated in FIG. 6 and the descriptions thereof). The controller 122 may obtain the binding history table signed with the digital signature.

In 930, the controller 122 (e.g., the authentication module 514) may verify the first authentication information using the first secure key. For example, the controller 122 may verify the digital signature for the binding history table associated with the storage medium using the public key of the storage medium. The digital signature verification process may be used to verify that the binding history table associated with the storage medium obtained by the controller 122 has not been changed, modified, or altered in transmission. Detailed descriptions of the digital signature verification process may be found elsewhere in the present disclosure (e.g., in connection with the authentication module 514 illustrated in FIG. 5 and the descriptions thereof).

In 932, the controller 122 (e.g., the first communication interface 504) may transmit the binding history table to the host. For example, the controller 122 may transmit the binding history table to the host via the communication interface 406 (as illustrated in FIG. 4). The binding history table transmitted to the host may be used by the host to determine whether the storage medium is a second-hand storage medium (e.g., as described in the process 700). In some embodiments, the controller 122 may also transmit the ID number of the storage medium to the host.

In 934, the controller 122 (e.g., the first communication interface 502) may receive a CMD2 from the host based on a determination that the controller 122 is not included in the binding history table. In some embodiments, the determination of whether the controller 122 is included in the binding history table may include the determination of whether the ID number of the controller 122 is included in the binding history table. The CMD2 herein may be similar to the CMD2 as illustrated in operation 716 of the process 700, and the description thereof is not repeated.

In 936, the controller 122 (e.g., the second communication interface 504) may transmit, based on the CMD2, a new binding history record corresponding to the controller 122 to the storage medium. The new binding history record corresponding to the controller 122 may be generated by controller 122 under the instruction of the host 110 or directly generated by the host 110. The new binding history record corresponding to the controller 122 may include the ID number (e.g., the product number, the serial number) of the controller 122 and a new binding count corresponding to the controller 122. In some embodiments, the new binding count corresponding to the controller 122 may be set as a non-zero value, which may indicate that it is the first time for the controller 122 to couple to the storage medium. In some embodiments, the new binding count corresponding to the controller 122 may be generated by incrementing a binding count corresponding to the controller 122 (e.g., a binding count that is not less than one) by a pre-set value (e.g., one, two, or three), which may indicate that the controller 122 has been coupled to one or more other storage media before it is coupled to this storage medium. In some embodiments, if the binding count corresponding to the controller 122 reaches the maximum count value of the counter in the controller 122, the binding count corresponding to the controller 122 may not be changed. In this case, the new binding count corresponding to the controller 122 in the new binding history record is equal to the maximum count value of the counter in the controller 122.

In 938, the controller 122 (e.g., the second communication interface 504) may transmit, based on the CMD2, second authentication information for the new binding history record to the storage medium. The second authentication information may be generated by the controller 122 using a fourth secure key of the controller 122. In some embodiments, the fourth secure key may be the private key of the controller 122, and the second authentication information for the new binding history record may be a digital signature for the new binding history record. Detailed descriptions of the generation of the digital signature may be found elsewhere in the present disclosure (e.g., the authentication information generation module 512 illustrated in FIG. 5 and the descriptions thereof).

The second authentication information for the new binding history record may be verified by the storage medium using the third secure key (e.g., the public key) of the controller 122. The digital signature verification process may be used to verify that the new binding history record has not been changed, modified, or altered in transmission. Descriptions of the digital signature verification process may be found elsewhere in the present disclosure (e.g., in connection with the authentication module 610 illustrated in FIG. 6 and the descriptions thereof).

In 940, the controller 122 (e.g., the second communication interface 504) may obtain, based on the CMD2, a first updated binding history table associated with the storage medium.

In some embodiments, the first updated binding history table may be generated by adding the new binding history record corresponding to the controller 122 to the existing binding history table of the storage medium. As described in operation 936, the new binding history record corresponding to the controller 122 may include the ID number of the controller 122 and a new binding count corresponding to the controller 122. The new binding count corresponding to the controller 122 in the new binding history record may be equal to one, or not less than one. In some embodiments, if the new binding count corresponding to the controller 122 in the new binding history record is equal to one, the new binding history record corresponding to the controller 122 may be directly added to an empty row of the binding history table in the storage medium to generate the first updated binding history table. In some embodiments, if the new binding count corresponding to the controller 122 in the new binding history record is not less than one, the storage medium may determine whether the new binding count corresponding to the controller 122 in the new binding history record exceeds the maximum count value of the corresponding counter in the storage medium. If the new binding count corresponding to the controller 122 in the new binding history record does not exceed the maximum count value of the corresponding counter in the storage medium, the new binding history record may be directly added to an empty row in the binding history table to generate the first updated binding history table. If the new binding count corresponding to the controller 122 in the new binding history record exceeds the maximum count value of the corresponding counter in the storage medium, the new binding count corresponding to the controller 122 in the new binding history record may be rejected by the storage medium, and in this case, the binding count corresponding to the controller 122 in the first updated binding history table may be set to a random value that is not less than one and not greater than the maximum count value.

In 942, the controller 122 (e.g., the first communication interface 502) may transmit the first updated binding history table to the host. For example, the controller 122 may transmit the first updated binding history table to the host via the communication interface 406 illustrated in FIG. 4.

In 944, the controller 122 (e.g., the first communication interface 502) may receive a CMD3 from the host based on a determination that the controller 122 is included in the first updated binding history table. The CMD3 herein may be similar to the CMD3 as illustrated in operation 720 of the process 700, and the description thereof is not repeated.

In 946, the controller 122 (e.g., the second communication interface 504) may transmit, based on the CMD3, an updated binding history record corresponding to the controller 122 to the storage medium. The updated binding history record may be generated by the controller 122 under the instruction of the host 110 or directly generated by the host 110. The updated binding history record corresponding to the controller 122 may include the ID number of controller 122 and an updated binding count corresponding to the controller 122. The updated binding count corresponding to the controller 122 may be generated by incrementing a binding count (i.e., a binding count that is not less than one) corresponding to the controller 122 by a pre-set value (e.g., one, two, or three). In some embodiments, if the binding count corresponding to the controller 122 reaches the maximum count value of the counter in the controller 122, the binding count corresponding to the controller 122 may not be changed, and in this case, the updated binding count corresponding to the controller 122 in the updated binding history record is equal to the maximum count value of the counter in the controller 122.

In 948, the controller 122 (e.g., the second communication interface 504) may transmit, based on the CMD3, third authentication information for the updated binding history record to the storage medium. The third authentication information may be generated by the controller 122 using the fourth secure key (i.e., the private key of the controller 122). In some embodiments, the third authentication information for the updated binding history record may be a digital signature for the updated binding history record. The digital signature for the updated binding history record may be generated by the controller 122 (e.g., the authentication information generation module 512 illustrated in FIG. 5) based on the private key of the controller 122 and the updated binding history record using a digital signature algorithm (e.g., the RSA algorithm, or the ECDSA). Detailed descriptions of the generation of the digital signature may be found elsewhere in the present disclosure (e.g., the authentication information generation module 512 illustrated in FIG. 5 and the descriptions thereof).

The third authentication information for the updated binding history record may be verified by the storage medium using the third secure key of the controller 122. Descriptions of the digital signature verification process may be found elsewhere in the present disclosure (e.g., the authentication module 610 illustrated in FIG. 6 and the descriptions thereof). When the digital signature is verified that the updated binding history record has not been changed, modified, or altered in transmission, the updated binding history record may be kept by the storage medium.

In 950, the controller 122 (e.g., the second communication interface 504) may obtain, based on the CMD3, a second updated binding history table associated with the storage medium.

The second updated history table may be generated based on the updated binding history record corresponding to the controller 122 obtained from the controller 122. The storage medium may retrieve the ID number of the controller 122 in the binding history table and determine the binding count corresponding to the controller 122 in the existing binding history table. In some embodiments, if the updated binding count corresponding to the controller 122 in the updated binding history record does not exceed the maximum count value of the corresponding counter in the storage medium, the storage medium may replace the binding count corresponding to the controller 122 in the existing binding history table with the updated binding count to generate the second updated binding history table. In some embodiments, if the updated binding count corresponding to the controller 122 in the updated binding history record exceeds the maximum count value of the corresponding counter in the storage medium, the storage medium may reject the updated binding count, and in this case, the binding count corresponding to the controller 122 in the existing binding history table may not be changed or updated.

In 952, the controller 122 (e.g., the first communication interface 502) may transmit the second updated binding history table to the host. For example, the controller 122 may transmit the second updated binding history table to the host via the communication interface 406 illustrated in FIG. 4.

By performing the process 900 as described above, cryptographic services (e.g., the implementations of digital signatures, secure keys, etc.) may be provided during the evaluation of the storage medium. The cryptographic services may ensure that the information exchanged during the process 900 cannot be faked.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 944 through 952 may be optional. For example, when the controller 122 is included in the binding history table, the binding history table in the storage medium may not be changed or updated.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method implemented on a host having at least one processor, a storage and a communication platform to connect to a network for evaluating a storage medium, the method comprising:
   receiving a user request to evaluate a storage medium coupled to a first controller via a user interface of the host;
   transmitting a command to the first controller in communication with the host to obtain a binding history table associated with the storage medium from the first controller; and
   determining whether the storage medium is a second-hand storage medium based on the binding history table associated with the storage medium, wherein the transmitting a command to the first controller in communication with the host to obtain a binding history associated with the storage medium from the first controller includes:
      determining whether there is a first binding history table associated with the storage medium stored in the host; and
      in response to a determination that there is no first binding history table associated with the storage medium stored in the host, transmitting a first command to the first controller to obtain the binding history table associated with the storage medium from the first controller.

2. The method of claim 1, wherein determining whether the storage medium is a second-hand storage medium based on the binding history table associated with the storage medium includes:
   determining whether there is at least one second controller different from the first controller in the binding history table; and
   determining that the storage medium is the second-hand storage medium in response to a determination that there is the at least one second controller different from the first controller in the binding history table.

3. The method of claim 2, further comprising:
   determining whether the first controller is included in the binding history table in response to a determination that there is no second controller different from the first controller in the binding history table;
   transmitting a second command to the first controller in response to a determination that the first controller is not in the binding history table; and
   obtaining, based on the second command, a first updated binding history table associated with the storage medium, wherein the first updated binding history table is generated by adding a new binding history record corresponding to the first controller to the binding history table.

4. The method of claim 3, further comprising:
   transmitting a third command to the first controller in response to a determination that the first controller is already in the binding history table; and
   obtaining, based on the third command, a second updated binding history table associated with the storage medium, wherein the second updated binding history table is generated by incrementing a binding count corresponding to the first controller by a pre-set value.

5. The method of claim 1, further comprising:
   transmitting a fourth command to the first controller, wherein:
      the fourth command directs the first controller to obtain a first secure key of the storage medium; and
      the first command further directs the first controller to:
         obtain first authentication information for the binding history table from the storage medium, wherein the first authentication information is generated by the storage medium using a second secure key of the storage medium; and
         verify the first authentication information using the first secure key.

6. The method of claim 4, wherein:
   the second command further directs the first controller to:
      transmit second authentication information for the new binding history record to the storage medium, wherein the second authentication information is generated by the first controller using a fourth secure key of the first controller; and
   the third command further directs the first controller to:
      transmit third authentication information for the second updated binding history table to the storage medium, wherein the third authentication information is generated by the first controller using the fourth secure key,
   wherein the second authentication information or the third authentication information is verified by the storage medium using a fifth secure key of the first controller.

7. The method of claim 1, further comprising:
   transmitting a fifth command to the first controller, wherein:
      the fifth command directs the first controller to transmit a third secure key of the first controller to the storage medium; and
      the first command further directs the first controller to:
         obtain a first Hash Value for the third secure key from the storage medium;
         obtain a second Hash Value for the first secure key from the storage medium;
         check whether the first Hash Value is equal to a third Hash Value for the third secure key, wherein the third Hash Value is generated by the first controller; and check whether the second Hash Value is equal to a fourth Hash Value for the first secure key, wherein the fourth Hash value is generated by the first controller.

8. The method of claim 7, wherein:
the fifth command directs the first controller to transmit a nonce to the storage medium; and
the first command further directs the first controller to:
obtain a fifth Hash Value for the nonce from the storage medium; and
check whether the fifth Hash Value is equal to a sixth Hash Value for the nonce, wherein the sixth Hash Value is generated by the first controller.

9. The method of claim 1, comprising:
in response to a determination that there is the first binding history table associated with the storage medium stored in the host, transmitting a sixth command to the first controller to obtain the binding history table associated with the storage medium from the first controller.

10. The method of claim 9, further comprising:
determining whether the binding history table is the same as the first binding history table;
determining whether there is at least one third controller in the binding history table different from the first controller in response to a determination that the binding history table is not the same as the first binding history table; and
determining that the storage medium is the second-hand storage medium in response to a determination that there is the at least one third controller different from the first controller in the binding history table.

11. The method of claim 10, further comprising:
determining whether the first controller is included in the binding history table in response to a determination that the binding history table is the same as the first binding history table;
transmitting a seventh command to the first controller in response to a determination that the first controller is not in the binding history table; and
obtaining, based on the seventh command, a third updated binding history table associated with the storage medium, wherein the third updated binding history table is generated by adding a new binding history record corresponding to the first controller.

12. The method of claim 11, further comprising:
transmitting an eighth command to the first controller in response to a determination that the first controller is already in the binding history table;
obtaining, based on the eighth command, a fourth updated binding history table associated with the storage medium, wherein the fourth updated binding history table is generated by incrementing a binding count corresponding to the first controller by a pre-set value.

13. A host having at least one processor, a storage and a communication platform to connect to a network for evaluating a storage medium, the host comprising:
a user interface configured to receive a user request to evaluate a storage medium coupled to a first controller;
a communication interface configured to transmit a command to the first controller in communication with the host to obtain a binding history table associated with the storage medium from the first controller; and
a processing module configured to determine whether the storage medium is a second-hand storage medium based on the binding history table associated with the storage medium, wherein to transmit a command to the first controller in communication with the host to obtain a binding history table associated with the storage medium from the first controller, the processing module is configured to:
determine whether there is a first binding history table associated with the storage medium stored in the host; and
the communication interface is configured to:
in response to a determination that there is no first binding history table associated with the storage medium stored in the host, transmit a first command to the first controller to obtain the binding history table associated with the storage medium from the first controller.

14. The host of claim 13, wherein to determine whether the storage medium is a second-hand storage medium based on the binding history table associated with the storage medium, the processing module is configured to:
determine whether there is at least one second controller different from the first controller in the binding history table; and
determine that the storage medium is the second-hand storage medium in response to a determination that there is the at least one second controller different from the first controller in the binding history table.

15. The host of claim 14, wherein:
the processing module is further configured to determine whether the first controller is included in the binding history table in response to a determination that there is no second controller different from the first controller in the binding history table; and
in response to a determination that the first controller is not in the binding history table, the communication interface is configured to transmit a second command to the first controller to obtain a first updated binding history table associated with the storage medium, wherein the first updated binding history table is generated by adding a new binding history record corresponding to the first controller to the binding history table.

16. The host of claim 15, wherein:
the communication interface is further configured to transmit a third command to the first controller in response to a determination that the first controller is already in the binding history table; and
the processing module is further configured to obtain, based on the third command, a second updated binding history table associated with the storage medium, wherein the second updated binding history table is generated by incrementing a binding count corresponding to the first controller by a pre-set value.

17. The host of claim 13, wherein, in response to a determination that there is the first binding history table associated with the storage medium stored in the host, the communication interface is configured to transmit a sixth command to the first controller to obtain the binding history table associated with the storage medium from the first controller.

18. The host of claim 17, wherein the processing module is configured to:
determine whether the binding history table is the same as the first binding history table;
determine whether there is at least one third controller in the binding history table different from the first controller in response to a determination that the binding history table is not the same as the first binding history table; and determine that the storage medium is the second-hand storage medium in response to a determination that there is the at least one third controller different from the first controller in the binding history table.

\* \* \* \* \*